(12) United States Patent
Ansari et al.

(10) Patent No.: US 11,678,368 B2
(45) Date of Patent: Jun. 13, 2023

(54) TECHNIQUE FOR LISTENING AFTER TALK

(71) Applicant: Telefonaktiebolaget LM Ericsson (publ), Stockholm (SE)

(72) Inventors: Junaid Ansari, Aachen (DE); Gen Li, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 172 days.

(21) Appl. No.: 16/758,889

(22) PCT Filed: Oct. 24, 2017

(86) PCT No.: PCT/EP2017/077119
§ 371 (c)(1),
(2) Date: Apr. 24, 2020

(87) PCT Pub. No.: WO2019/080994
PCT Pub. Date: May 2, 2019

(65) Prior Publication Data
US 2021/0185727 A1 Jun. 17, 2021

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 28/0268* (2013.01); *H04W 74/002* (2013.01); *H04W 74/0825* (2013.01)

(58) Field of Classification Search
None
See application file for complete search history.

(56) References Cited

U.S. PATENT DOCUMENTS

2008/0161035 A1 7/2008 Tomioka et al.
2009/0257421 A1* 10/2009 Nakashima ....... H04W 74/0833
370/345
(Continued)

FOREIGN PATENT DOCUMENTS

CN 102651869 A 8/2012
CN 103747450 A 4/2014
(Continued)

OTHER PUBLICATIONS

Luo, Jian, et al., "Preliminary radio interface concepts for mmwave mobile communications", Millimetre-Wave Based Mobile Radio Access Network for Fifth Generation Integrated Communications (mmMAGIC); Version: 3.0; Duration: 24 months, Jan. 7, 2015, pp. 1-232.
(Continued)

*Primary Examiner* — Jutai Kao
(74) *Attorney, Agent, or Firm* — Christopher & Weisberg, P.A.

(57) ABSTRACT

A technique for transmitting and receiving data (502) on shared radio spectrum according to a listen after talk, LAT, procedure is described. As to a transmitting aspect of the technique, one or more parameters of the LAT procedure are set. At least one of the one or more parameters (510; 520) is set depending on at least one of a Quality of Service, QoS, requirement of the data and a state of the shared radio spectrum. The data (502) is transmitted on the shared radio spectrum according to the LAT procedure using the one or more parameters.

27 Claims, 15 Drawing Sheets

(51) Int. Cl.
 *H04W 28/02* (2009.01)
 *H04W 74/00* (2009.01)

(56) References Cited

U.S. PATENT DOCUMENTS

| | | | |
|---|---|---|---|
| 2009/0286528 A1* | 11/2009 | Lie | H04W 68/00 |
| | | | 455/422.1 |
| 2011/0038432 A1 | 2/2011 | Potkonjak | |
| 2012/0033613 A1* | 2/2012 | Lin | H04W 74/085 |
| | | | 370/328 |
| 2016/0165378 A1* | 6/2016 | Harsha | H04W 4/70 |
| | | | 370/329 |
| 2016/0278088 A1 | 9/2016 | Cheng et al. | |
| 2018/0227805 A1* | 8/2018 | Jang | H04W 28/26 |
| 2019/0053235 A1* | 2/2019 | Novlan | H04L 5/001 |
| 2019/0059113 A1* | 2/2019 | He | H04W 74/0833 |

FOREIGN PATENT DOCUMENTS

| | | |
|---|---|---|
| CN | 104333902 A | 2/2015 |
| WO | 2009123420 A2 | 10/2009 |
| WO | 2009123420 A3 | 9/2011 |
| WO | 2016197315 A1 | 12/2016 |

OTHER PUBLICATIONS

Mangold, Stefan, et al., "Analysis of IEEE 802.11 E For QoS Support in Wireless LANs", The Evolution of Wireless LANs and PANs; IEEE Wireless Communications, Dec. 2003, pp. 1-11.

Xiang, Wei, et al., "5G Mobile Communications", Spectrum Sharing for 5G, 2016, pp. 1-7.

Unknown, Author, "Electromagnetic compatibility and Radio spectrum Maters (ERM); Wideband transmission systems", ETSI EN 300 328 V1.8.1, Jun. 2012, pp. 1-84.

\* cited by examiner

100

200

(Reference Example)

700

700

TECHNIQUE FOR LISTENING AFTER TALK

TECHNICAL FIELD

The present disclosure generally relates to a technique for transmitting and receiving data on shared spectrum. More specifically, methods and devices are provided for transmitting and receiving data according to a listening after talk (LAT) procedure.

BACKGROUND

Mobile broadband will continue to drive demands for high overall traffic capacity and high achievable end-user data rates. Several use-cases and deployment scenarios will require data rates of up to 10 Gbps. These demands for very high system capacity and very high end-user data rates can be met by networks with distances between access nodes ranging from a few meters in indoor deployments to roughly 50 m in outdoor deployments, i.e., with an infrastructure density considerably higher than most dense networks of today. The wide transmission bandwidths needed to provide data rates of up to 10 Gbps and above can likely be obtained from spectrum allocations in the centimeter and millimeter-wave bands. High-gain beamforming, typically realized with array antennas, can be used to mitigate the increased path loss at higher frequencies, and benefit from spatial reuse and multi-user schemes. Such networks may be referred to as 5G New Radio (NR).

Besides using licensed spectrum bands, NR may operate (at least partly) in unlicensed bands and license-shared bands especially for enterprise deployment scenarios. Thus, coexistence support is needed to enable efficient spectrum sharing among different stations, different networks (including different operators) and/or different radio access technologies.

The conventional listen-before-talk (LBT) procedure is a flexible mechanism for sharing the spectrum among a plurality of stations or systems (e.g., service sets). LBT is a distributed control mechanism, i.e., there is no need to exchange information (e.g., scheduling signals) between different coexisting systems. In deployments of a wireless local area network (WLAN) according to the standard family IEEE 802.11 (also referred to as Wi-Fi), carrier sense multiple access with collision avoidance (CSMA/CA) is used for medium access. This means that the channel is first sensed to perform a clear channel assessment (CCA), and a data transmission is then initiated only if the channel is declared as idle. In case the channel is declared as busy, the data transmission is deferred until the channel is deemed idle.

While the conventional LBT procedure provides effective spectral coexistence for omnidirectional and wide-beamwidth transmissions, numerous studies have shown that the conventional LBT procedure is not reliable for highly directional transmissions. For example, when a beam to or from one access point (AP) overlaps with another AP using the same frequency, all transmissions related to the other AP are deferred during directional transmissions to and from the one AP, because the other AP detects the directional transmissions, even though the directional transmissions do not interfere at a station radio-linked to the other AP. Effectively, this means that several APs (i.e., several service sets) within range may share the spectrum in time, even though the corresponding radio links are spatially separated, so that the throughput for the individual APs may be severely degraded compared to the actual channel capacity.

Furthermore, coexisting network deployments to implement NR and coexisting stations to be served by NR include very different use cases such as high-reliability and low-latency machine-to-machine (M2M) communications, above-mentioned high data rate communications for broadband devices as well as sparse and energy-efficient communications for narrowband Internet of Things (NB-IoT) devices.

SUMMARY

Accordingly, there is a need for technique that allows sharing a radio spectrum for different use cases. More specifically, there is a need for a technique that allows controlling orders of priority for directional radio links sharing a radio spectrum.

As to one aspect, a method of transmitting data on shared radio spectrum according to a listen after talk (LAT) procedure is provided. The method comprises or triggers a step of setting one or more parameters of the LAT procedure. At least one of the one or more parameters is set depending on at least one of a Quality of Service (QoS) requirement of the data and a state of the shared radio spectrum. The method further comprises or triggers a step of transmitting the data on the shared radio spectrum according to the LAT procedure using the one or more parameters.

At least in some deployments using directional links (e.g., transmissions and/or receptions using beamforming or spatial selectivity) or massive multiple-input multiple-output (MIMO) radio channels, the Listen-After-Talk (LAT) procedure can perform better (e.g., in terms of reliability, latency and data rate) than a conventional Listen-Before-Talk (LBT) procedure. By setting the LAT parameters for such deployments, e.g., implementations of NR or other future wireless systems, the technique may allow controlling priorities or traffic classes in accessing the shared radio spectrum and/or resolve contention, e.g., so that the QoS requirements are adequately satisfied.

Herein, the shared radio spectrum may encompass, without being limited thereto, any radio medium that is used for data communication by different radio links with an overlap in the frequency domain.

The technique may be implemented as a method of configuring radio devices for the LAT. Particularly, the technique may be implemented to manage the QoS of directional radio links coexisting according to the LAT procedure.

The transmission of the data may apply the LAT procedure, e.g., for accessing the shared radio spectrum. The LAT procedure may use the one or more set parameters. Transmitting the data according to the LAT procedure may be characterized by not listening on the shared radio spectrum before the transmission of the data, e.g., by not listening on the shared radio spectrum between availability of the data to be transmitted (e.g., in a buffer and/or transport block) and the transmission of the data.

Herein, to "listen" or "listening" may refer to receiving, or attempting to receive, on the shared radio spectrum. The reception or the attempt receive may be indicative of occupancy or clearance of the shared radio spectrum (which may also be referred to as a channel). For example, the shared radio spectrum may be clear, if no signal is received and/or if energy received in a radio resource element of the shared radio spectrum is less than a predefined threshold value. Alternatively or in addition, the shared radio spectrum may be clear if decoding a received signal is unsuccessful.

The parameters of the LAT procedure may be referred to as LAT parameters or control parameters.

The QoS requirement may comprise multiple requirements. The QoS requirement may relate to at least one of reliability, latency and data rate for the transmission of the data.

The state of the shared radio spectrum may comprise multiple states. The state of the shared radio spectrum may relate to at least one of a contention level in the shared radio spectrum, spectral interference in the shared radio spectrum, a beamwidth of directional transmissions of the data, a density of active stations (e.g., active nodes) in the shared radio spectrum and a combination thereof. The combination may be weighted.

The LAT parameters may govern a temporal share of the transmitter or the corresponding radio link in using the shared radio spectrum. The QoS requirements may specify a priority level of the transmitter or the corresponding radio link. The LAT parameters may depend on the QoS requirements so that the higher the priority level the greater the temporal share. For example, the LAT parameters may relate to the timing of the LAT procedure. The transmitter may access the shared radio spectrum for the data transmission more rapidly and/or for a longer period the greater the priority level.

The LAT procedure may include one or more intervals. The one or more parameters of the LAT procedure may include a duration of at least one of the one or more intervals.

The duration of an interval that enable the transmission of the data may be longer for a higher (i.e., superior) priority level represented by the QoS requirement and/or may be longer for a worse (i.e., inferior) state of the shared radio spectrum. Alternatively or in addition, the duration of an interval that prohibits the transmission of the data may be shorter for a higher (i.e., superior) priority level represented by the QoS requirement and/or may be shorter for a worse (i.e., inferior) state of the shared radio spectrum.

The LAT procedure may include an initial waiting interval. The one or more parameters of the LAT procedure may include a duration of the initial waiting interval. The transmitter may defer transmitting the data for the duration of the waiting interval.

The initial waiting interval may be triggered by the availability of the data to be transmitted. Preferably, the transmitter does not listen to the shared radio spectrum during the initial waiting interval.

The dependency of the duration of the initial waiting interval on the QoS requirement may include a decreasing function for the duration of the initial waiting interval depending on the QoS requirement. The duration of the initial waiting interval may be shorter for radio links that use the shared radio spectrum and are associated with a higher QoS requirement, as compared to radio links using the shared radio spectrum and associated with a lower QoS requirement.

The LAT procedure may include a transmission interval for the transmission of the data. The one or more parameters of the LAT procedure may include a duration of the transmission interval.

The transmission of the data may occur within the transmission interval. The data may be transmitted in one or more data packets (e.g., transmission blocks). Each data packet may comprise a header. An acknowledgment feedback (e.g., a positive acknowledgment or ACK, or a negative acknowledgment or NACK) may be received in response to at least some or each of the one or more data packets. The transmission interval may encompass the reception of one or more acknowledgment feedbacks associated to the transmission of the data. For example, the transmission interval does not encompass receiving further data from a receiver of the data transmission.

The transmission interval may start by the transmission of the data. Preferably, the transmitter does not listen to the shared radio spectrum prior to the transmission interval.

The dependency of the duration of the transmission interval on the QoS requirement may include an increasing function for the duration of the transmission interval depending on the QoS requirement. The duration of the transmission interval may be longer for radio links that use the shared radio spectrum and are associated with a higher QoS requirement, as compared to radio links using the shared radio spectrum and associated with a lower QoS requirement.

The LAT procedure may include receiving one or more control signals from at least one of a receiver of the data, a transmitter interfering the data transmission, a receiver being interfered by the data transmission and a transmitter being interfered by the data transmission.

The one or more control signals may include at least one of a notification to send (i.e., transmit) the data (notify-to-send or NTS) and a notification not to send (i.e., not transmit) the data (notify-not-to-send or NNTS). Herein, to "listen" or "listening" may encompass receiving, or attempting to receive, one or more of the control signals.

The method may be performed by a transmitting station (briefly: transmitter, e.g., a transmitting node). The LAT procedure may include, at the transmitting station, at least one of the following steps. When the data arrives or is available for transmission (e.g., in a service data unit, SDU), the transmitter may transmit the data directly on the shared radio spectrum in the transmitting step without listening to the shared radio spectrum. If not all data to be transmitted has been transmitted by the end of a transmission interval (e.g., after a continual transmission or transmitting a sequence of data packets), the transmitter may stop the transmission for listening on the shared radio spectrum during a listening interval. When the transmitter enters the listening interval, the transmitter may listen on the shared radio spectrum (e.g., on the channel) to detect control signals (e.g., NTS or NNTS) from other radio links. If the transmitter receives a control signal from another radio link (e.g., as indicated by an identifier of the other radio link, which is encoded in the signal), the transmitter may defer the further transmission of the data (e.g., the transmitter stops the data transmission until access to the shared radio spectrum is regained according to the LAT procedure). The state of the transmitter in the listening interval may also be referred to as idle listening or idle. The listening interval may also be referred to as an LAT interval, an idle period or an idle listening interval. If the transmitter receives no positive acknowledgment (ACK) or receives a negative acknowledgment (NACK), the transmitter may enter a receiver-controlled interval (briefly: controlled interval). The absence of the ACK message or the reception of the NACK message may be indicative of interference at the receiver. In the controlled interval, the transmitter may listen for a control signal (e.g., the NTS) from its receiver. The transmitter may stop the transmission and may start listening for the control signal from its receiver of the data (e.g., the receiver radio-linked to the transmitter) to transmit the data again.

The data may be received by a receiving station (briefly: receiver, e.g., a receiving node). The LAT procedure may include, at the receiving station, at least one of the following steps. When starting to receive the data, the receiver monitors the shared radio spectrum (e.g., the channel) to decode the data. If the data is decoded successfully, the receiver transmits the ACK message immediately. Otherwise, the receiver transmits the NACK message. Furthermore, if the receiver determines that the data transmission has failed due to the interference caused by another transmitter (e.g., another radio-link), an indicator may be included in the NACK message. When the data is not decoded successfully, the receiver starts listening on the shared radio spectrum (e.g., the channel) to detect a data header indicative of a time position (e.g., a beginning) of the listening interval of the interfering transmitter. At the beginning of the listening interval of the interfering transmitter, the receiver transmits a control signal (e.g., the NTS) controlling its transmitter (e.g., the transmitter radio-linked to the receiver) to start (e.g., restart) the transmission of the data.

The LAT procedure may include a listening interval for receiving at least one of the control signals. The one or more parameters of the LAT procedure may include a duration of the listening interval.

Multiple NTSs from different radio links may be transmitted in one listening interval. For example, the listening interval may be divided into multiple part. Herein, the parts may be orthogonal in the time domain and/or the frequency domain. Each transmitter that is to transmit (at least) one of the control signals (e.g., the NTS) according to the LAT procedure (e.g., for requesting access to the shared spectrum) may randomly select one of the multiple parts to transmit its NTS.

The header of one packet of the data transmission may be indicative of the duration of the transmission interval used by another pair of radio-linked stations. Hence, an interfered station may derive (e.g., compute or anticipate) the time when the interfering data transmission.

The listening interval may be subsequent to the transmission of the data, e.g., to the transmission interval. The listening interval may directly follow the transmission interval.

The dependency of the duration of the listening interval on the QoS requirement includes a decreasing function for the duration of the transmission interval depending on the QoS requirement. Herein, a greater or higher QoS requirement may be represented by a numerically smaller or lower class identifier. E.g., "1" may represent the highest QoS requirement.

Setting the one or more parameters of the LAT procedure may include setting the one or more parameters to one or more predefined initial values based on the QoS requirement. Alternatively or in addition, setting the one or more parameters of the LAT procedure may include updating the one or more parameters responsive to a change of the state of the shared radio spectrum.

The method may further comprise or trigger a step of computing a utility function representing the state of the shared radio spectrum. The utility function may depend on at least one of a spectral interference on the shared radio spectrum, a contention level on the shared radio spectrum, a beamwidth used for the transmission on the shared spectrum and a density of stations using the shared spectrum according to the LAT procedure.

The one or more parameters of the LAT procedure may be set (e.g., updated) depending on the utility function and/or a temporal course of the utility function.

The data may be transmitted on a radio link between a transmitter and a receiver. The QoS requirement of the data may be specific for at least one of the transmitter, the receiver and the radio link.

The QoS requirement may be indicated by a traffic class, e.g., for the data, the radio link, the transmitter and/or the receiver. The QoS requirement may be represented by a QoS class indicator (QCI). The QoS requirement may depend on a service or application providing or using the data and/or triggering the transmission.

Multiple radio links may coexist using the shared radio spectrum according to the LAT procedure. Different radio links may apply the LAT procedure according to different (e.g., radio link-specific) parameters of the LAT procedure.

The state of the shared radio spectrum may relate to a usage of the shared radio spectrum. The shared radio spectrum may be used by multiple transmitters including the transmitter of the data, multiple receivers including the receiver of the data and/or multiple radio links including the radio link for the transmission of the data. The multiple radio links may spatially overlap or intersect.

The LAT procedure may be characterized by the receiver of the data coordinating the transmission of the data on the radio link. Alternatively or in addition, the LAT procedure may be characterized by at least one of the receiver and the transmitter transmitting (e.g., broadcasting) control signals after the transmission of the data.

The transmission of the data may use beamforming. The transmission of the data may be directed towards the receiver using the beamforming, e.g., by means of an antenna array. The beamforming may be controlled by a precoding matrix.

Alternatively or in addition, the interference may be caused by a directed transmission from an interfering transmitted and/or for an interfering radio link. The interference may be localized at the receiver of the data transmission. The transmitter of the data transmission may be unaware or unable to measure the interference.

The state of the shared radio spectrum may depend on a beamwidth (e.g., an azimuthal angle or solid angle) of the beamforming. The state of the shared radio spectrum may relate to the beamwidth of the beamforming and/or the precoding matrix. The radio link may include one or more spatial streams. The radio link may include a multiple-input multiple-output (MIMO) channel between the transmitter and the receiver.

The method may further comprise or trigger a step of determining at least one of the QoS requirement of the data and the state of the shared radio spectrum. The step of determining may include receiving a message (e.g., a control message or a measurement report) that is indicative of at least one of the QoS requirement of the data and the state of the shared radio spectrum. The message may be received from the receiver of the data. The determining step may include or may be implemented by the reception of the message.

A base station (e.g., the receiver or the transmitter of the data) may determine at least one of the QoS requirement and the state. The message indicative of at least one of the QoS requirement of the data and the state of the shared radio spectrum may be received from a mobile station (e.g., the transmitter or the receiver of the data).

Alternatively or in addition, the step of determining may include measuring (e.g., at the receiver of the data transmission) at least one of the reliability, the latency and a channel capacity of a radio link between the transmitter and the receiver, a contention level in the shared radio spectrum, spectral interference in the shared radio spectrum, a beamwidth of directional transmissions of the data, a density of active stations in the shared radio spectrum. At least one of the QoS requirement and the state may be determined based on a result of the measurement.

Setting the one or more parameters of the LAT procedure may include transmitting or receiving at least one configuration message that is indicative of at least one of the one or more parameters of the LAT procedure.

The configuration message may be transmitted to the receiver of the data. Alternatively or in addition, the configuration message, or a further configuration message indicative of at least one of the one or more LAT parameters, may be received from the receiver of the data.

Setting the one or more LAT parameters may include configuring, by a base station (e.g., the transmitter or the receiver of the data in the transmitting step), the one or more LAT parameters. The base station may set the one or more LAT parameters of its own LAT procedure and/or the LAT parameters of a mobile station (e.g., the receiver or the transmitter of the data in the transmitting step, respectively). The base station (e.g., an eNB or gNB) may transmit the configuration message. The mobile station (e.g., a UE or any other radio device) may receive the configuration message, wherein the configuration message triggers setting the LAT parameters as the mobile station according to the configuration message. As a result of the setting step, the parameters of the LAT procedures at the base station and the mobile station are equal.

As to another aspect, a method of receiving data on shared radio spectrum according to a listen after talk (LAT) procedure is provided. The method comprises or triggers a step of setting one or more parameters of the LAT procedure. At least one of the one or more parameters is set depending on at least one of a Quality of Service (QoS) requirement of the data and a state of the shared radio spectrum. The method further comprises or triggers a step of receiving the data on the shared radio spectrum according to the LAT procedure using the one or more parameters.

The LAT procedure may include one or more intervals. The one or more parameters of the LAT procedure may include a duration of at least one of the one or more intervals. For example, the LAT procedure may include a transmission interval for the transmission of the data. The one or more parameters of the LAT procedure may include a duration of the transmission interval. Alternatively or in addition, the LAT procedure may include a listening interval for at least one of transmitting and receiving one or more control signals. The one or more parameters of the LAT procedure may include a duration of the listening interval.

The LAT procedure may include transmitting one or more control signals to at least one of a transmitter of the data and an interfering transmitter, e.g., a transmitter interfering with the data transmission.

Setting the one or more parameters of the LAT procedure may include updating the one or more parameters responsive to a change of the state of the shared radio spectrum. A utility function representing the state of the shared radio spectrum may be computed. The utility function and/or the state may depend on at least one of a spectral interference on the shared radio spectrum, a contention level on the shared radio spectrum, a beamwidth used for the transmission on the shared spectrum and a density of stations using the shared spectrum according to the LAT procedure.

The reception of the data may use beamforming. The reception may apply an antenna array comprising a plurality of antenna elements.

The other method aspect may further comprise any feature or step, or a corresponding feature or step, disclosed in the context of the one method aspect.

The technique, e.g., the one aspect or the other aspect, may be implemented at a base station or a radio device. The base station may encompass any station that is configured to provide radio access to the radio device. The base station may be a node, or may be controlled by a node, of a radio access network (RAN). The radio device may be any station configured to wirelessly access the base station or the RAN.

The radio device may be configured for peer-to-peer communication (e.g., on a sidelink) and/or for accessing the RAN (e.g. an UL and/or downlink, DL). The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The LAT procedure may implement, or may be compatible with, any embodiment disclosed in the document WO 2016/197315 A1.

The technique may be implemented on a Physical Layer (PHY), a Medium Access Control (MAC) layer, a Radio Link Control (RLC) layer and/or a Radio Resource Control (RRC) layer of a protocol stack for the radio communication.

This technique may be implemented as a configurable LAT procedure for managing priorities of different stations (e.g., nodes) or radio links in accessing the medium (e.g., the shared radio spectrum), e.g., based on the QoS requirements (also referred to as traffic QoS demands). In particular, an initial waiting interval may be introduced in the LAT procedure based on the traffic QoS demand. Traffic with low priority may have a shorter initial waiting interval, and vice-versa. Moreover, a transmission interval (also referred to as transmission period), before a listening interval (also referred to as idle listening period) is performed in the LAT procedure, may be set (e.g., controlled) based on the traffic QoS being served. For low QoS traffic, the transmission interval may be kept smaller to potentially allow high priority traffic to be sent out. The listening interval in the LAT procedure after the data transmission may be configured to allow listening to multiple NTS and/NNTS messages and defer accordingly. The LAT parameters may be set (e.g., controlled) in combination. Alternatively or in addition, the LAT parameters may adapted based on at least one of traffic load, beamwidths, contention levels and achieved reliability.

The technique may be implemented to govern priority management for accessing the medium in the LAT procedure so that different traffic QoS requirements at different nodes and/or different links can be satisfied. The technique may be implemented to control the LAT parameters (i.e., the LAT medium access configuration) based on the traffic type (as an example of the QoS requirements).

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via at least one of the RAN, the Internet, the base station and the transmitter. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for transmitting data on shared radio spectrum according to a listen after talk (LAT) procedure is provided. The device is configured to perform the one method aspect. Alternatively or in addition, the device may comprise a setting unit configured to set one or more parameters of the LAT procedure. At least one of the one or more parameters is set depending on at least one of a Quality of Service (QoS) requirement of the data and a state of the shared radio spectrum. The device further comprises a transmitting unit configured to transmit the data on the shared radio spectrum according to the LAT procedure using the one or more parameters.

As to another device aspect, a device for receiving data on shared radio spectrum according to a listen after talk (LAT) procedure is provided. The device is configured to perform the other method aspect. Alternatively or in addition, the device may comprise a setting unit configured to set one or more parameters of the LAT procedure. At least one of the one or more parameters is set depending on at least one of a Quality of Service (QoS) requirement of the data and a state of the shared radio spectrum. The device further comprises a receiving unit configured to receive the data on the shared radio spectrum according to the LAT procedure using the one or more parameters.

As to a further aspect, a device for transmitting data on shared radio spectrum according to a listen after talk (LAT) procedure is provided. The device comprises at least one processor and a memory. Said memory comprises instructions executable by said at least one processor whereby the device is operative to set one or more parameters of the LAT procedure. At least one of the one or more parameters is set depending on at least one of a Quality of Service (QoS) requirement of the data and a state of the shared radio spectrum. Execution of the instructions further causes the device to be operative to transmit the data on the shared radio spectrum according to the LAT procedure using the one or more parameters.

As to a still further aspect, a device for receiving data on shared radio spectrum according to a listen after talk (LAT) procedure is provided. The device comprises at least one processor and a memory. Said memory comprises instructions executable by said at least one processor whereby the device is operative to set one or more parameters of the LAT procedure. At least one of the one or more parameters is set depending on at least one of a Quality of Service (QoS) requirement of the data and a state of the shared radio spectrum. Execution of the instructions further causes the device to be operative to receive the data on the shared radio spectrum according to the LAT procedure using the one or more parameters.

As to a still further aspect, a device for transmitting data on shared radio spectrum according to a listen after talk (LAT) procedure is provided. The device may comprise one or more modules for performing the one method aspect. Alternatively or in addition, the device comprises a parameter module for setting one or more parameters of the LAT procedure. At least one of the one or more parameters is set depending on at least one of a Quality of Service (QoS) requirement of the data and a state of the shared radio spectrum. The device further comprises a transmission module for transmitting the data on the shared radio spectrum according to the LAT procedure using the one or more parameters.

As to a still further aspect, a device for receiving data on shared radio spectrum according to a listen after talk (LAT) procedure is provided. The device may comprise one or more modules for performing the other method aspect. Alternatively or in addition, the device comprises a parameter module for setting one or more parameters of the LAT procedure. At least one of the one or more parameters is set depending on at least one of a Quality of Service (QoS) requirement of the data and a state of the shared radio spectrum. The device further comprises a reception module for receiving the data on the shared radio spectrum according to the LAT procedure using the one or more parameters.

Any of the devices (or any node or station for embodying the devices) may further include any feature disclosed in the context of the one method aspect or the other method aspect. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

Figure 1:
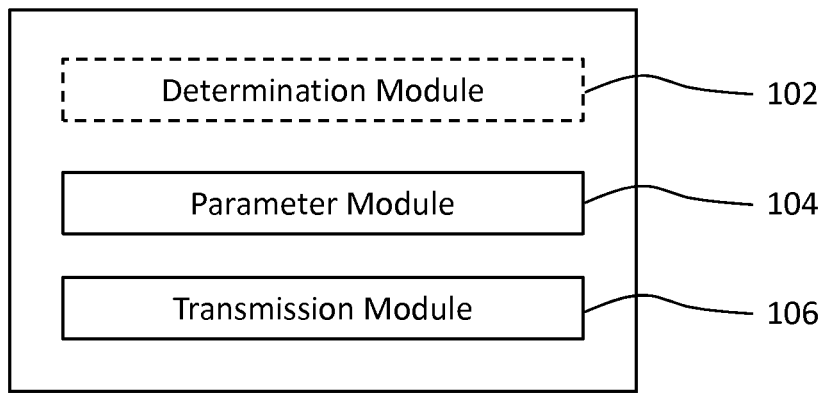
FIG. 1 shows a schematic block diagram of a device for transmitting data on shared radio spectrum according to a Listen-After-Talk procedure.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE and LTE with License-Assisted Access (LTE-LAA) or a successor thereof, a Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

While terminology from 5G or NR, e.g., as specified by the 3rd Generation Partnership Project (3GPP), is used in this disclosure to exemplify the technique, the technique is not limited to a specific radio access technology. Other wireless systems such as Wi-Fi may also benefit from exploiting the technical considerations of this disclosure.

While there are strong reasons to use directional communication, e.g., for cm-Wave and mm-Wave frequencies, the subject technique is equally applicable to other (e.g., lower) frequencies, wherein directional transmissions is optionally used. The technique is applicable to unlicensed spectrum, license-shared spectrum and/or licensed spectrum.

Furthermore, terminologies such as base station (e.g., access node or eNodeB) and radio device (e.g., UE) are non-limiting examples. Particularly, such terminology may, but does not necessarily, imply a certain hierarchical relation between the two. In general, an access node (AN) may be considered as device 1 and a user equipment (UE) may be considered as device 2, and these two devices communicate with each other over some radio channel. The methods allow devices to communicate in a device-to-device (D2D) fashion and/or a network-assisted D2D fashion.

In this section, the technique is described in more detail by a number of exemplary embodiments. These embodiments are not mutually exclusive. Components from one embodiment may be tacitly assumed present in another embodiment, and a person skilled in the art understands how those components may be used in the other exemplary embodiments.

FIG. 1 schematically illustrates a block diagram of a device for transmitting data on shared radio spectrum according to a listen after talk (LAT) procedure. The device is generically referred to by reference sign 100.

The device 100 comprises a parameter module 104 that sets one or more parameters of the LAT procedure. At least one of the one or more parameters is set depending on at least one of a Quality of Service (QoS) requirement of the data and a state of the shared radio spectrum. The device 100 further comprises a transmission module 106 that transmits the data on the shared radio spectrum according to the LAT procedure using the one or more parameters. Optionally, the device 100 further comprises a determination module 102 that determines at least one of the QoS requirement of the data and the state of the shared radio spectrum.

Any of the modules of the device 100 may be implemented by units configured to provide or control the corresponding functionality.

The device 100 may be embodied by a radio device that is radio-connected or radio-connectable to a radio access network (RAN). For example, the device 100 may be embodied by a mobile station or user equipment (UE). Alternatively or in addition, the device 100 may be embodied by a base station providing radio access. For example, the device 100 may be embodied by an access node or any node of the RAN or connected to the RAN.

Figure 2:
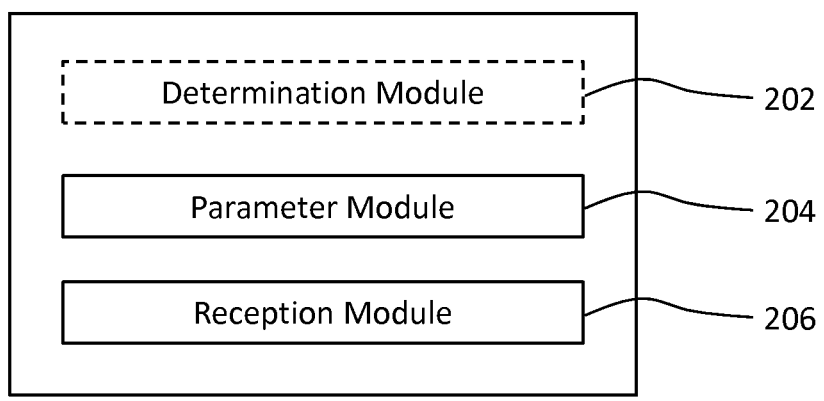
FIG. 2 shows a schematic block diagram of a device for receiving data on shared radio spectrum according to a Listen-After-Talk procedure.

FIG. 2 schematically illustrates a block diagram of a device for receiving data on shared radio spectrum according to an LAT procedure. The device is generically referred to by reference sign 200.

The device 200 comprises a parameter module 204 that sets one or more parameters of the LAT procedure. At least one of the one or more parameters is set depending on at least one of a QoS requirement of the data and a state of the shared radio spectrum. The device 200 further comprises a reception module 206 that receives the data on the shared radio spectrum according to the LAT procedure using the one or more parameters. Optionally, the device 200 further comprises a determination module 202 that determines at least one of the QoS requirement of the data and the state of the shared radio spectrum.

Any of the modules of the device 200 may be implemented by units configured to provide or control the corresponding functionality.

The device 200 may be embodied by a radio device that is radio-connected or radio-connectable to a RAN. For example, the device 200 may be embodied by a mobile station or UE. Alternatively or in addition, the device 200 may be embodied by a base station providing radio access.

For example, the device 200 may be embodied by an access node or any node of the RAN or connected to the RAN.

Herein, the base station may encompass a network controller (e.g., a Wi-Fi access point) or a radio access node (e.g., a 3G Node B, a 4G eNodeB or a 5G gNodeB) of the RAN. The base station may be configured to provide radio access. Alternatively or in addition, the radio device may encompass a mobile or portable station, a user equipment (UE, particularly a wideband UE), a narrowband Internet of Things (NB-IoT) device and/or a device for machine-type communication (MTC). Moreover, two or more embodiments of the devices 100 and 200 may be configured to wirelessly connect to each other, e.g., in an ad-hoc radio network or via 3GPP sidelinks.

Preferably, if the devices 100 and 200 are implemented by a radio device and a base station, respectively or vice versa, the base station (e.g., its determination module 102 or its parameter module 104) is configured to determine the at least one LAT parameter and to transmit a configuration message indicative of the at least one LAT parameter to the radio device. The radio device (e.g., its determination module 202 or its parameter module 204) is configured to receive the configuration message and to determine the at least one parameter according to the received configuration message.

Moreover, a base station implementing at least one of the device 100 and the device 200 may be configured to collectively determine the at least one LAT parameter for each of a plurality of radio devices radio-connected to the base station. A configuration message indicative of the individual at least one LAT parameter may be transmitted to the corresponding one of the radio devices.

Figure 3:
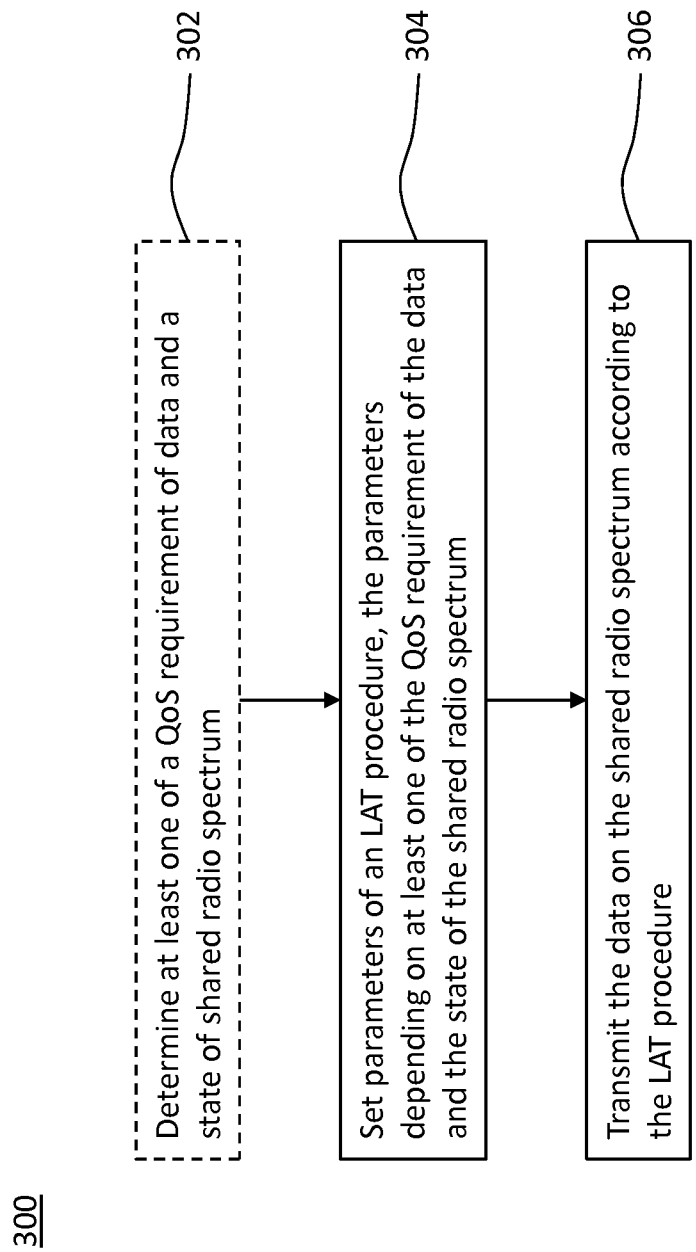
FIG. 3 shows a flowchart for a method of transmitting data on shared radio spectrum according to a Listen-After-Talk procedure, which is implementable by the device of FIG. 1.

FIG. 3 shows a flowchart for a method 300 of transmitting data on shared radio spectrum according to an LAT procedure. The method 300 comprises a step 304 of setting one or more parameters of the LAT procedure. At least one of the one or more parameters depends on at least one of a QoS requirement of the data and a state of the shared radio spectrum. The data is transmitted on the shared radio spectrum according to the LAT procedure using the one or more parameters in a step 306. Optionally, at least one of the QoS requirement and the state is determined in a step 302.

The method 300 may be performed by the device 100. For example, the modules 104 and 106, and optionally the module 102, may perform the steps 304 and 306, and optionally the step 302, respectively.

Figure 4:
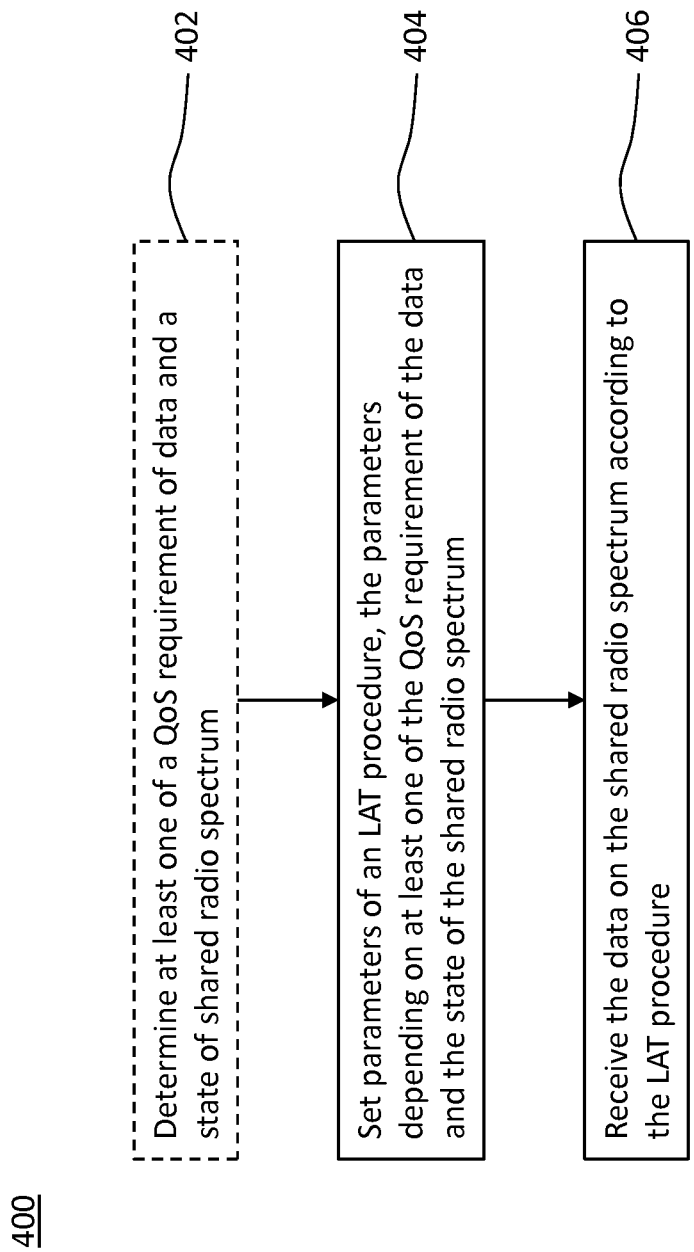
FIG. 4 shows a flowchart for a method of receiving data on shared radio spectrum according to a Listen-After-Talk procedure, which is implementable by the device of FIG. 2.

FIG. 4 shows a flowchart for a method 400 of receiving data on shared radio spectrum according to an LAT procedure. The method 400 comprises a step 404 of setting one or more parameters of the LAT procedure. At least one of the one or more parameters depends on at least one of a QoS requirement of the data and a state of the shared radio spectrum. The data is received on the shared radio spectrum according to the LAT procedure using the one or more parameters in a step 406. Optionally, at least one of the QoS requirement and the state is determined in a step 402.

The method 400 may be performed by the device 200. For example, the modules 204 and 206, and optionally the module 202, may perform the steps 404 and 406, and optionally the step 402, respectively.

At least some embodiments of the technique are compatibility with LAT techniques described in the book "5G Mobile Communications", Springer, October 2016, pages 51 to 73.

Figure 5:
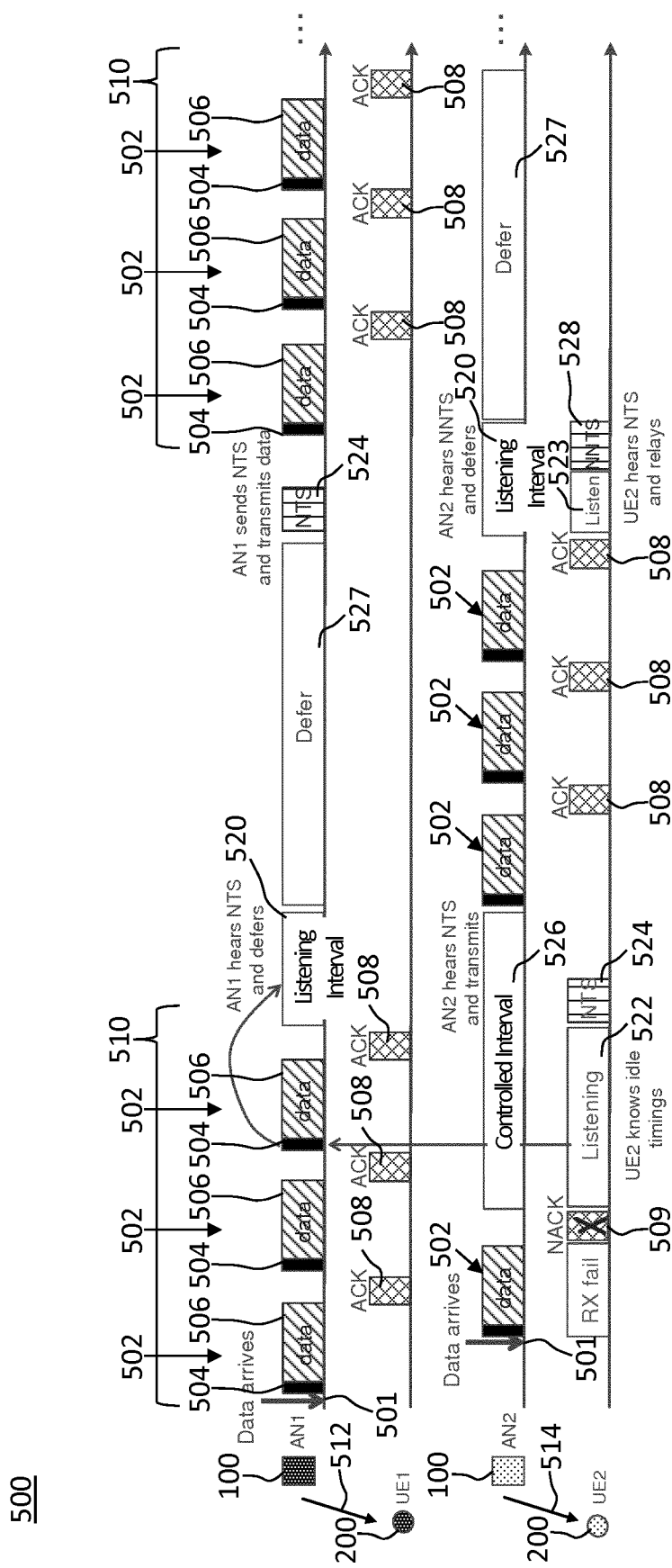
FIG. 5 illustrates a schematic signaling diagram resulting from first embodiments of the devices of FIGS. 1 and 2 in radio communication.

FIG. 5 shows a signaling diagram 500 for first embodiments of the devices 100 and 200, features of which are combinable with any implementation or embodiment disclosed herein. Particularly, the technique may be implemented as an LAT configuration technique for QoS management.

The signaling diagram 500 schematically illustrated in FIG. 5 results from a radio communication caused by and conducted between the first embodiments of the devices 100 and 200.

The LAT procedure is part of the technique and may be implemented in accordance with WO 2016/197315 A1. Unlike conventional omnidirectional transmit and receive antenna radiation patterns, directional communication has different hidden-terminal and an exposed-terminal problems. Moreover, narrow-beamwidth directional transmissions are more prone to deafness problems as compared to wider beamwidth transmissions. Narrow-beamwidth directional transmissions may encounter at least one of the following beamforming problems. A first beamforming problem, which may be referred to as hidden-terminal problem, refers to the case when the transmitter is unable to listen to the potential interferer resulting into packet collision (cf. interference) at the receiver. A second beamforming problem, which may be referred to as exposed-terminal problem, refers to the case when the potential transmitter overhears an ongoing transmission and refrains from its own transmission although its transmission would have not interfered with the ongoing transmission at the receiver. A third beamforming problem, which may be referred to as deafness problem, refers to the case when a receiver is unable to hear the (e.g., directional) transmission from a transmitter. In above definition of beamforming problems, the expression terminal may be used interchangeably with station or node.

The LAT procedure may be implemented to solve the above-mentioned hidden-node problem and/or exposed-node problem, e.g., in the case of massive antennas elements (i.e., large antenna arrays) for beamforming (at the device 100 as the transmitter and/or at the device 200 as the receiver). A cause for the severe above-mentioned beamforming problems when using a conventional LBT procedure is the large difference between sensed power at the transmitter (or source node, SN) side and interference power at the receiver (or destination node, DN) side when using high-gain beamforming. The LBT procedure relies on listening at the transmitter side to determine if there is interference at the receiver side and, thus, a large difference between them can result in any one of the above-mentioned beamforming problems.

To solve at least some of the beamforming problems, the LAT procedure considers involving the receiver to sense the channel directly. Another motivation for the LAT procedure is a low-interference environment i.e., a low number of collisions even for naïve direct transmissions when using high-gain beamforming. For this reason, the LAT procedure adopts a different logic as compared to the convention LBT procedure, described as follows. A default mode for the device 100 as the transmitter is to transmit the data in the step 306 as the data becomes available. The data is not transmitted only after confirming that the shared radio spectrum (i.e., the radio channel) is clear, i.e., not occupied by interfering transmissions. The approach of the LAT procedure is that the device 100 transmits when data packets arrive (i.e., are available for transmission). A potential collision is then detected and resolved by the device 200 using control signaling (i.e., coordination signaling).

For a clear understanding of the LAT procedure, the following definitions are introduced. An idle time is assumed after a continuous or contiguous data transmission (optionally including separate data packets and associated acknowledgment feedbacks). This is reasonable for the shared radio spectrum (e.g., an unlicensed band), since there are typically channel occupation limitation rules. E.g., the transmitter must stop transmitting and enter an idle state (i.e., a non-transmitting state, not necessarily a state without receiver activity) after the time duration of the continuous or contiguous transmission exceeds a given threshold, which is referred to as the duration of the transmission interval. The control signaling includes a Notify-To-Send (NTS) message. The NTS message may be transmitted by the transmitter or the receiver of the data. The NTS message includes the link information, which will transmit the data and an expected occupation time duration. The control signaling further comprises a Notify-Not-To-Send (NNTS) message, which is transmitted from the receiver of the data, telling its transmitter (i.e., the transmitter radio-linked to the receiver for the data transmission) not to transmit data in an indicated duration.

A short description of a non-limiting example for the LAT procedure is given with reference to the signaling diagram 500 of FIG. 5. By way of example and without limitation, access nodes (labeled AN1 and AN2) implement the transmitters, i.e., embodiments of the device 100, and UEs (labeled UE1 and UE2 radio-linked to AN1 and AN2, respectively) implement the receivers, i.e., embodiments of the device 200. In a corresponding example, the roles of the access nodes may implement the devices 200 and the UEs may implement the devices 100.

Responsive to the availability 501 of the data 502, the data 502 is transmitted according to the transmitting step 306 in data packets, each including a header 504 and the payload data 506. Within the transmission interval 510 used for the step 306, the receiver device 200 transmit a positive or negative acknowledgment feedback, i.e., ACK 508 or NACK 509, respectively.

In the example illustrated in FIG. 5, a first radio link 512 between embodiments AN1 and UE1 of the devices 100 and 200, respectively, interacts (e.g., temporarily interferes) with a second radio link 514 between embodiments AN2 and UE2 of the devices 100 and 200. While the example illustrated in FIG. 5 includes one interfering radio link 512, the LAT procedure is capable of coordinating interference from multiple interfering radio links.

Each header 504 or at least the header 504 of the last data packet 502 within the transmission interval 510 is indicative of when the listening interval 520 starts after the transmission 306 and/or when the transmission interval 510 of the transmission 306 ends. Optionally, each header 504 or at least the last header 504 is further indicative of a duration of the listening interval 520. Alternatively or in addition, the start and/or the duration of the listening interval 520 is configured by RRC signaling.

A listening function 522 at the device 200 as the receiver of the data 502 in the second link 514 is triggered when the device 200 detects interference (caused by the transmission 306 on the first link 512) and fails to receive the data 502 on the second link 514.

The device 200 as the receiver of the data 502 of the interfered second link 514 coordinates the transmission 306 of the data 502 on the second radio link 514 with the device 100 as the transmitter of the interfering first radio link 512. The coordination is performed in the idle time of the interfering first radio link 512, i.e., in the listening interval 520 of the first radio link 512.

In the first instance of the interaction between the radio links 512 and 514 illustrated in FIG. 5, the second radio link 514 is interfered by the first radio link 512. When UE2 as the device 200 of the second radio link 514 fails to decode the data 502 on its radio link 514, the device 200 of the interfered second radio link 514 starts to look for the listening interval 520 (which may also be referred to as idle period) of the interfering first radio link 512. In the listening interval 520 of the interfering first radio link 512 (preferably at the beginning of the listening interval 520), the device 200 of the interfered second radio link 514 transmits the NTS message 524 towards the direction of AN2 as the device 100 of the second radio link 514. Since UE2 as the device 200 of the second radio link 514 is interfered by AN1 as the device 100 of the first radio link 512, AN1 can receive the NTS message 524 and defers in a step 527 its transmission (e.g., because an identifier in the NTS message 524 of the radio link 514 does not match its own radio link 512). While deferring its transmission, AN1 as the device 100 may listen to the shared radio spectrum, e.g., similarly to the listening function 522. AN2 as the device 100 of the second radio link 514 receives the NTS message 524 in a receiver-controlled interval 526 (i.e., while listening for control signals from its radio-linked receiver UE2) and transmits its data 502 according to the step 306, as the NTS message 524 of the second radio link 514 indicates.

The headers of the data 502 on the second radio link 514 and/or the NTS message 524 from the second link 514 are indicative of when AN2 as the device 100 of the second radio link 514 stop its transmission 306 and starts to listen 523 for control signals 524 from the first radio link 512, i.e., in the listening interval 520 of the second radio link 514.

During (preferably at the beginning of) the listening interval 520 of the second radio link 514, AN1 as the device 100 of the first radio link 512 transmits the NTS message 524 that can be received by UE2 as the device 200 of the second radio link 514. Responsive to the reception of the NTS message 524 from the first radio link 512, UE2 as the device 200 of the second radio link 514 relays (by transmitting) an NNTS message 528. The NNTS message 528 from the device 200 informs its radio-linked device 100 (i.e., the radio-linked transmitter AN2) which resource is occupied by the interfering first radio link 512. Responsive to the NNTS message 528, the device 100 refrains in a step 527 from transmitting. Rather, the device 100 performs the listening function 522. By this scheme, the transmission of interfering links 512 and 514 (e.g., the first radio link 512 embodied by AN1-UE1 and the second radio link 512 embodied by AN2-UE2) is coordinated in a distributed way in order to carry out transmissions efficiently by taking turns.

Figure 6:
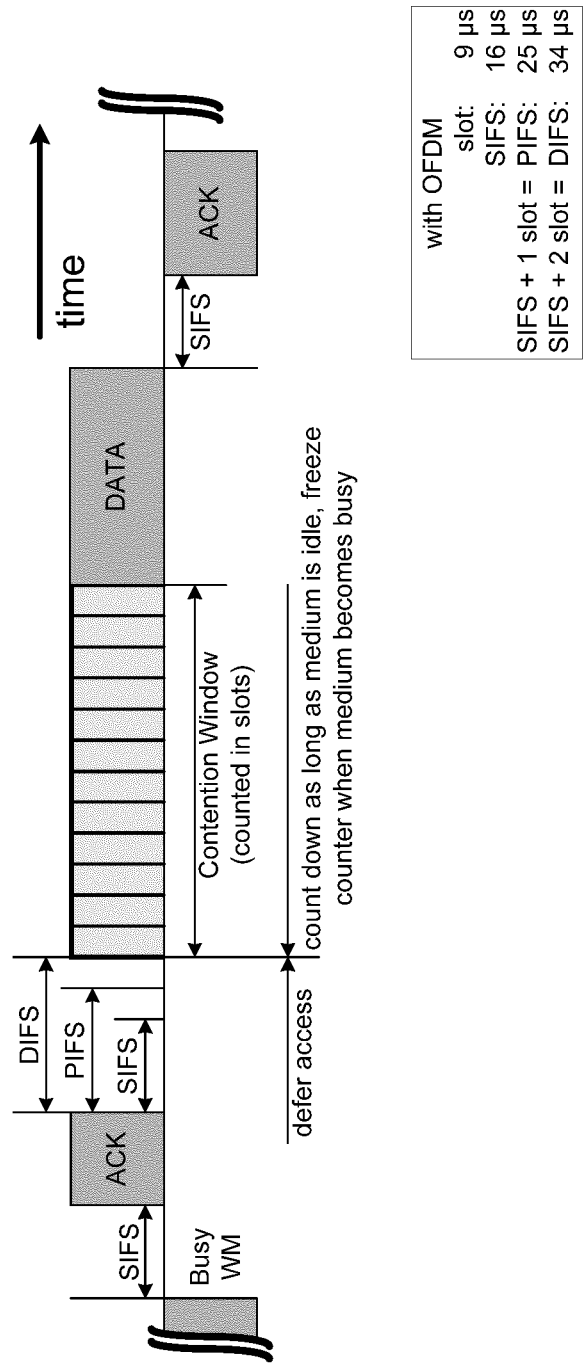
FIG. 6 illustrates a schematic signaling diagram for a Listen-Before-Talk procedure as a reference example.

FIG. 6 schematically illustrates a signaling diagram 600 on a shared radio medium according to a conventional Listen-Before-Talk (LBT) procedure as a reference example.

Wi-Fi systems based on the standard family IEEE 802.11 (e.g., the standards IEEE 802.11g/n/ac) operate in low frequencies, namely 2.4 and 5 GHz. Their listen and talk operations, i.e., sensing, reception and transmission are predominantly omnidirectional. Wi-Fi uses an LBT procedure as part of its distributed coordination function (DCI). A key objective of conventional LBT is to avoid interference between simultaneous data transmissions. Practical application results show that this works well in the case of omnidirectional transmissions.

After a Wi-Fi station "A" transmits a data frame to a station "B", the station B transmits an ACK frame back to station A with a delay of 16 is corresponding to a Short Interframe Space (SIFS). Such an ACK frame is transmitted by the station B without performing the LBT operation. To prevent another station interfering with such an ACK frame transmission, any station defers for a duration of 34 is referred to as DCF interframe space (DIFS) after the channel is observed to be occupied before a subsequent attempt to assess again whether or not the channel is occupied. Therefore, a station that wishes to transmit first performs a clear channel assessment (CCA) by sensing the medium for the fixed duration of the DIFS. If the medium is found to be idle, the station assumes that it may take ownership of the medium and begin a frame exchange sequence. If the medium is busy, the station waits for the medium to go idle, defers for DIFS, and waits for a further random back off period.

To further prevent a station from occupying the channel continuously and, thereby, prevent other stations from accessing the channel, it is required for a station wishing to transmit again after a transmission is completed to perform a random back off.

The PCF interframe space (PIFS) of the point coordination function (PCF) is used to gain priority access to the medium, and is shorter than the DIFS duration. Among other cases, it can be used by stations (e.g., access points) operating under the PCF, e.g., to transmit beacon frames (BFs) with priority. At the nominal beginning of each contention-free (CF) period (CFP), a point coordinator (PC, e.g., the access point) senses the shared radio medium. When the medium is determined to be idle for one PIFS period (e.g., 25 µs), the PC transmits the BF containing a CF parameter set element and a delivery traffic indication message element.

In order to compare the different LAT and LBT procedures for coexistence (i.e., for sharing a radio spectrum), extensive simulations have been conducted to study both mean user-experienced data rate and 5%-cell-edge user-experienced data rate under different traffic settings. Herein, a "user-experienced" data rate is the data rate (i.e., the throughput) at the corresponding radio device (e.g., the UE). The 5%-cell-edge user-experienced data rate is defined as the fifth percentile point of a cumulative distribution function of the data rate at the user.

Figure 7B:
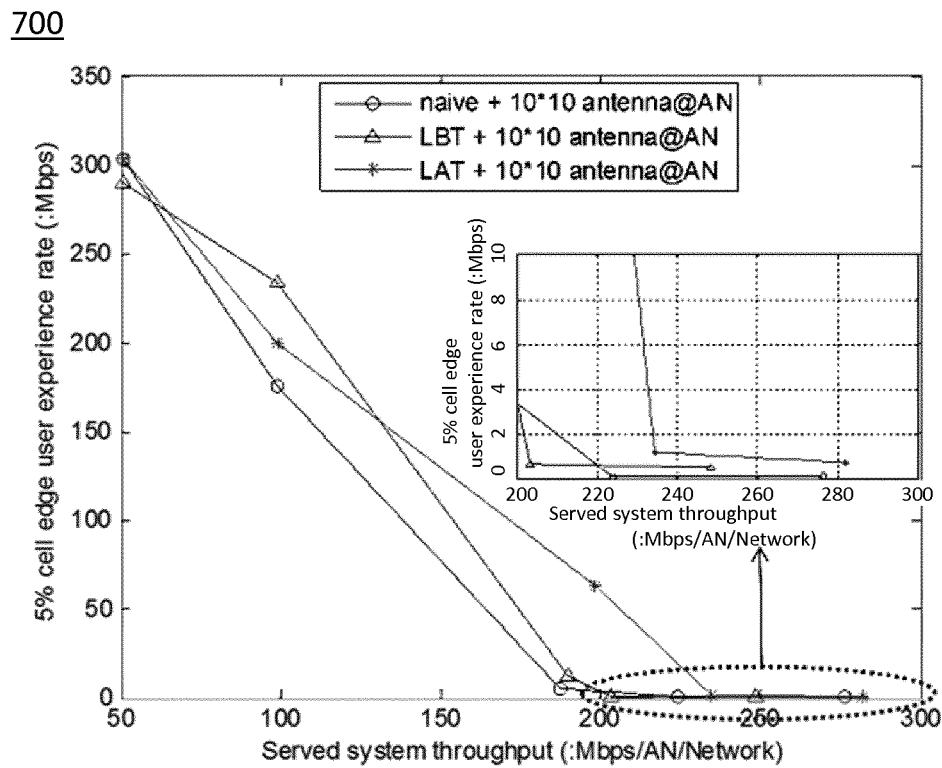
FIG. 7B shows graphs for a cell-edge user-experienced data rate as a function of a served system throughput.
Figure 7A:
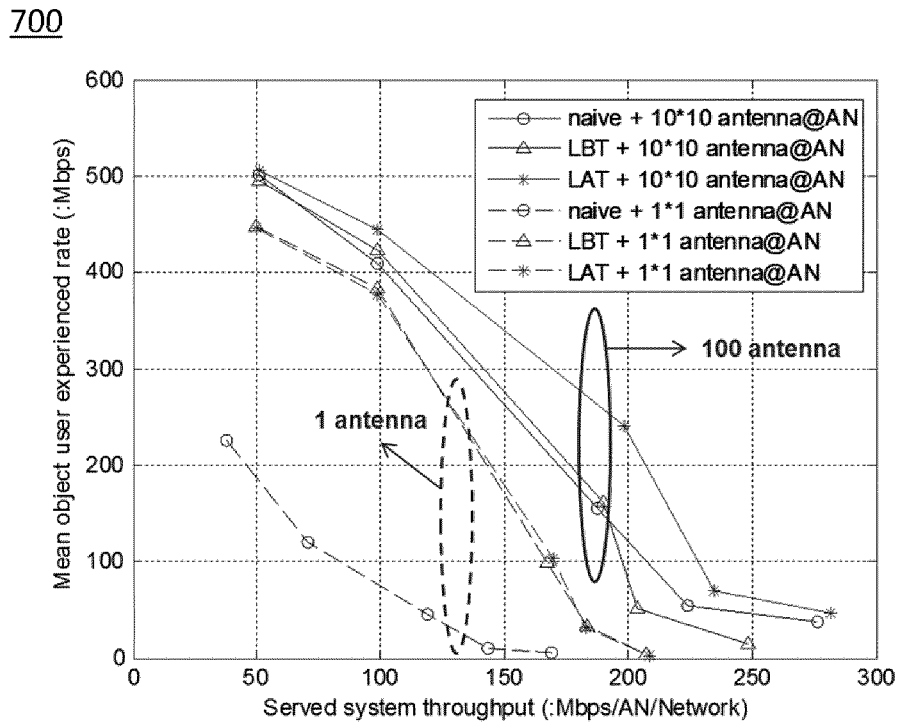
FIG. 7A shows graphs for a mean user-experienced data rate as a function of a served system throughput.

Graphs 700 of the mean user-experience data rate as a function of the served system throughput (e.g., per base station) are shown in FIG. 7A for different beamwidths. Herein, "served" may refer to the actually transmitted bits per second. Graphs 700 of the 5%-cell-edge user-experience data rate as a function of the served system throughput are shown in FIG. 7B for different beamwidths.

The more antenna elements are in an antenna array used for the transmission 306, the narrower is the beamwidth. As is evident from the dashed curves in FIG. 7A, the LBT procedure works much better than a naïve schemes (i.e., direct transmission without any coordination) and has a performance similar to the LAT procedure in the case of 1 antenna element (i.e., an antenna array of size "1*1"). This means that the LBT procedure is well suited for omnidirectional or wide-beam transmissions. However, in the case of 100 antenna elements (e.g., an antenna array of size "10*10"), as shown by the solid lines in FIGS. 7A and 7B, the LBT procedure has a performance similar to the naïve scheme in the case of low traffic (e.g., below 200 Mbits per second, per access node and per RAN), and worse performance than the naïve scheme in the case of high traffic (e.g., at least 200 Mbits per second, per access node and per RAN). On the other hand, the LAT procedure has a much better performance than the LBT procedure in terms of both mean and 5%-cell-edge user-experienced data rate.

Figure 8:
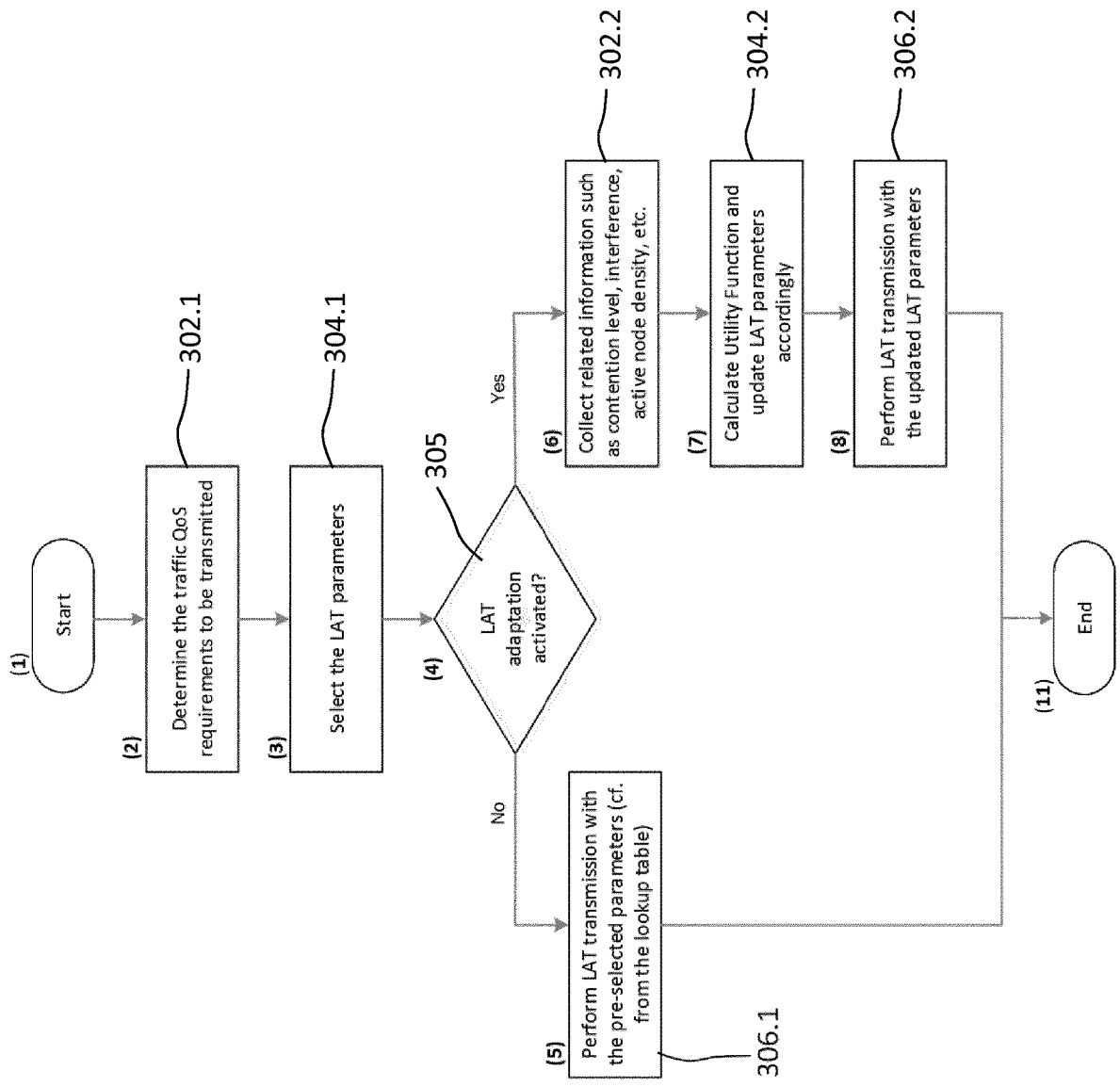
FIG. 8 shows a flowchart for a second embodiment of the method of FIG. 3.

FIG. 8 shows a flowchart for a second embodiment of the method 300 at the device 100. The second embodiment may be combined with any feature disclosed in the context of the first embodiments of the devices 100 and 200. Particularly, the method 300 may be implemented as a process of QoS management.

While the second embodiment is described for the device 100 implementing the method 300, corresponding steps and features may be embodied at the device 200 implementing the method 400. For example, "performing LAT transmission" in instances of the step 306 may be replaced by "performing LAT reception" in corresponding instances of the step 406. Instances of the step 302 and/or the step 304 may correspond to instances of the step 402 and 404, respectively.

In a first instance 302.1 of the step 302, the QoS requirements of the data 502 to be transmitted are determined. In a first instance 304.1 of the step 304, the LAT parameters (i.e., the one or more parameters of the LAT procedure) are selected. For example, a base station (e.g., an eNB or gNB) embodying the device 100 sets its local LAT parameters and transmits a configuration message indicative of the selected LAT parameters to the radio device (e.g., a UE), thus inducing the setting of the LAT parameters at the radio device embodying the device 200.

A branching point 305 of the second embodiment of the method 300 depends on whether changing the LAT parameters depending on the current state of the shared radio spectrum (which is also referred to as LAT adaptation) is activated or deactivated. If the LAT adaptation is deactivated (or if the state has not changed), the transmission 306 is performed in a first instance 306.1 of the step 306 using the LAT parameters as initially selected (or as previous changed).

If the LAT adaptation is activated, the state of the shared radio spectrum is determined in a second instance 302.2 of the step 302. The state of the shared radio spectrum may be determined based on at least one of a contention level, interference and a density of active nodes. For example, components are combined by a utility function that determines at least one of the state and the LAT parameters. Such components may include the afore-mentioned contention level, interference and/or density of active nodes. Based on the utility function, the LAT parameters are set (e.g., updated by a change relative to the initial setting of the instance 304.1) in a second instance 304.2 of the step 304. The transmission 306 is performed in a second instance 306.2 of the step 306 using the LAT parameters as set in the second instance 304.2.

Examples of the one or more parameters of the LAT procedure (shortly: LAT parameters) set in the step 304 and 404 for differentiating between (e.g., prioritizing) different embodiments of the devices 100 and 200 and/or between different radio links are described, e.g., with reference to FIGS. 9, 10 and 11. Any subset of the exemplary LAT parameters may be set by the technique for controlling the relative priorities among different embodiments of the device 100 or the device 200.

Figure 9:
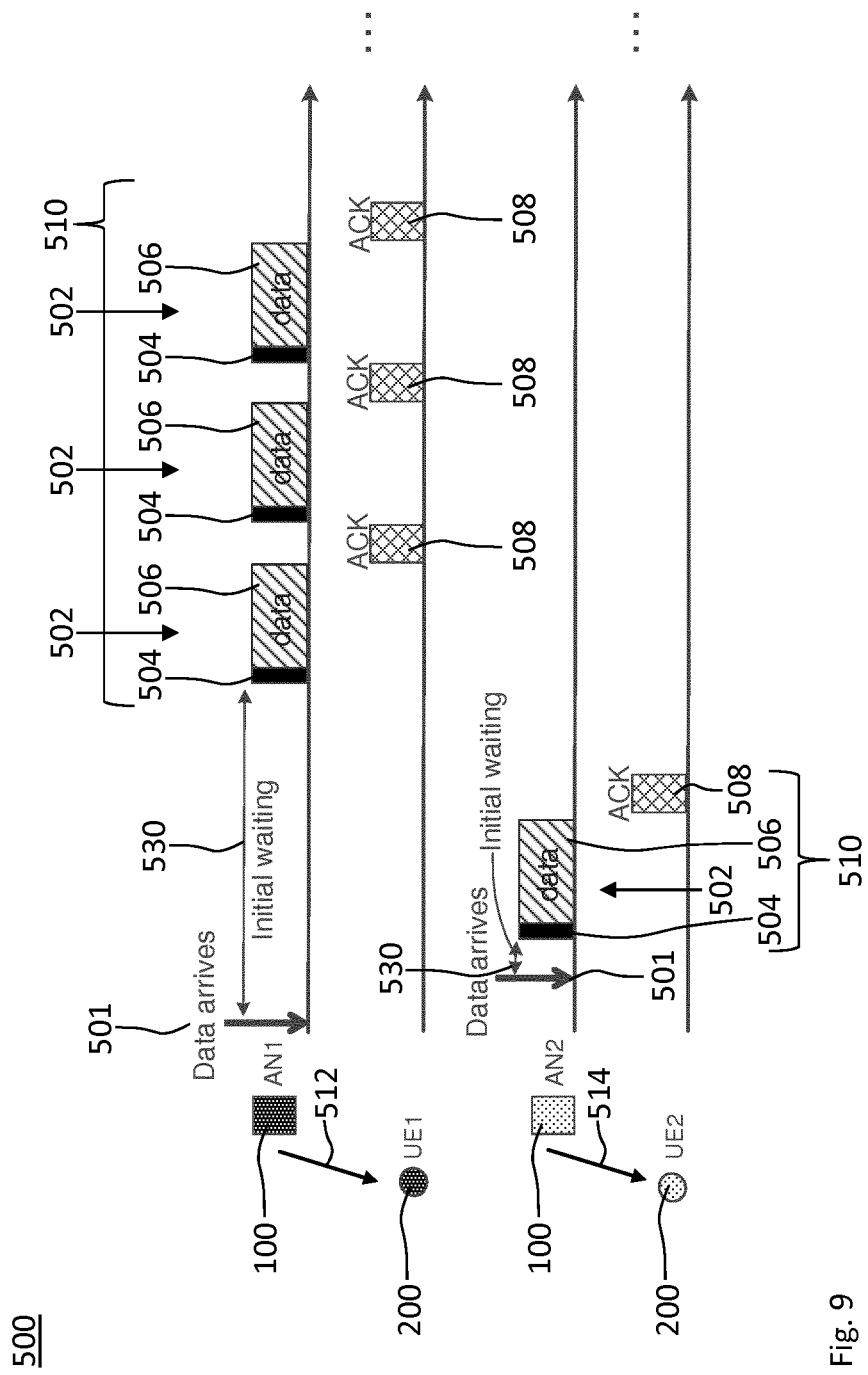
FIG. 9 shows a signaling diagram resulting from third embodiments of the devices of FIGS. 1 and 2 for controlling an initial waiting interval.
Figure 10:
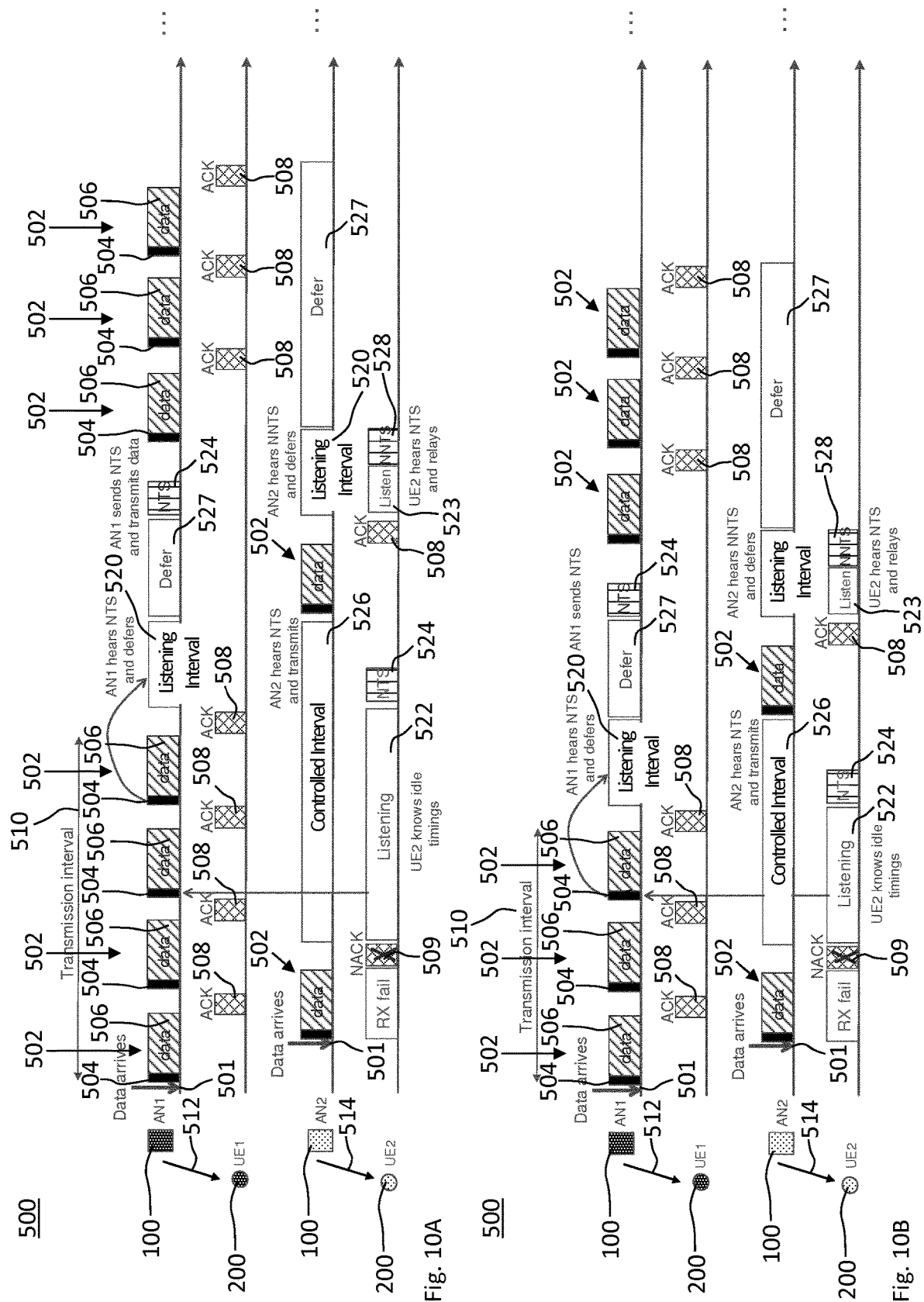
FIG. 10A shows a signaling diagram resulting from fourth embodiments of the devices of FIGS. 1 and 2 for controlling a transmission interval.
FIG. 10B shows a signaling diagram resulting from fifth embodiments of the devices of FIGS. 1 and 2 for controlling a transmission interval.

FIG. 9 schematically illustrates a signaling diagram 500 resulting from third embodiments of the devices 100 and 200 for controlling an initial waiting interval 530 as a non-limiting example of the at least one LAT parameter. Features and steps that correspond to those of the first and second embodiments are indicated by like reference signs.

The initial waiting interval 530 may be the time elapsed between availability 501 of the data for transmission and the start of the transmission 306. Different embodiments of the device 100 may apply different initial waiting intervals 530 before issuing (i.e., transmitting) the data 502 (e.g., the first data frame) according to the LAT procedure in the step 306. A shorter initial waiting interval (i.e., less time between availability 501 and transmission 306) for high-priority data traffic, e.g., on the first radio link 512 from the access node AN2 as one embodiment of the device 100, enables the device 100 to transmit in the step 306 the data 502 on the radio link 512 to its radio-linked receiver (e.g., the UE2) embodying the device 200 earlier than low-priority data traffic on a second radio link 514 from AN1 destined for UE1.

In order to govern priority for accessing the shared radio spectrum, the coexisting embodiments of the device 100 wait for the configurable time interval 530 for the data transmission 306 based on the traffic QoS requirements determined in the step 302. The configuration is performed in the step 304. Embodiments of the device 100, which have data traffic with a higher priority, wait for a shorter interval 530 before issuing their data frame transmission using the LAT procedure, and vice-versa.

In the non-limiting example illustration in FIG. 9, the embodiment AN1 of the device 100 has low-priority data traffic for the embodiment UE1 of the device 200, while the embodiment AN2 of the device 100 has data traffic with a higher priority to the embodiment UE2 of the device 200. Hence, a longer initial waiting interval 530 is set for the embodiment AN1 of the device 100 before issuing data frames to the embodiment UE1 of the device 200, which allows the embodiment AN2 of the device 100 to transmit data 502 to the embodiment UE2 of the device 200 with a shorter initial waiting interval 530.

The nodes (i.e., the embodiments of the devices 100 and 200) may implement pre-defined initial waiting intervals 530 based on the QoS requirements, e.g., according to the first instances of the steps of the second method embodiment (described with reference to FIG. 8). Alternatively or in addition, the initial waiting intervals 530 are reconfigured at runtime based on the state of the shared radio spectrum, e.g., according to the second instances of the steps of the second method embodiment (described with reference to FIG. 8). The initial waiting intervals 530 may depend on at least one of the contention levels, the number or density of nodes, the transmission beamwidths and the encountered interference levels.

FIGS. 10A and 10B shows a signaling diagram resulting from fourth and fifth embodiments, respectively, of the devices 100 and 200 for controlling the transmission interval 510 as a non-limiting example of the at least one LAT parameter. Features and steps that correspond to those of any one of the first to third embodiments are indicated by like reference signs.

The technique may be implemented for controlling the transmission interval 510 in order to prioritize data traffic with different QoS requirements at different nodes (i.e., embodiments of the devices 100 and 200) and/or different radio links (e.g., at reference signs 512 and 514) in the LAT procedure.

In FIG. 10A, a longer transmission interval 510 used by the embodiment AN1 of the device 100 for the data transmission 306 to the embodiment UE1 of the device 200 lets the embodiment AN2 of the device 100 wait for a longer time for its data transmission 306 to the embodiment UE2 of the device 200. In FIG. 10B a shorter transmission interval 510 used by the embodiment AN1 of the device 100 for its data transmission 306 to the embodiment UE1 of the device 200 allows the embodiment AN2 of the device 100 to transmit high-priority data 502 to the embodiment UE2 of the device 200 earlier.

The transmission interval 510 of the LAT procedure may be set in the step 304 (e.g., initially set in the first instance 304.1 and/or changed or adapted in the second instance 304.2) based on the traffic QoS requirements. Medium occupancy (i.e., usage of the shared radio spectrum in the step 306) for extended durations by low-priority traffic is avoided by setting the duration of transmission interval 510 as a restriction on the maximum transmission duration before the idle listening operation has to be performed.

Depending on the priority level of the data traffic 502, the transmission interval 510 of the LAT procedure is selected in the step 304. Accordingly, data traffic 502 with a lower priority has a shorter transmission interval 510 before the nodes (i.e., the radio-linked embodiments of the device 100 and 200) are bound to perform the idle listening operation (i.e., the listening interval 520), and vice-versa. This dependency of the transmission interval 510 on the priority level (e.g., a priority level of the data 502, of the transmitter embodiment of the device 100 and/or of the associated radio link) allows other nodes (e.g., other transmitter embodiments of the device 100 and/or other radio links) with a higher priority level to access the shared radio spectrum in the respective instance of the step 306. If there is no other traffic (e.g., if no NTS message 524 is received), the device 100 further continues its data frame transmission if more data 502 to be transmitted is available.

Preferably, some or each header 504 of the data frames or data packets 502 contains information indicative of whether there are more data frames queued at the transmitting node (i.e., at the transmitting embodiment of the device 100) and/or of an associated priority level. Optionally, this information is copied in the corresponding ACK message by the destination node (i.e., by the receiving embodiment of the device 200 radio-linked to the transmitting embodiment of the device 100). Thus, an overhearing node (e.g., any other embodiment of the devices 100 and 200 that is not radio-linked to transmitting embodiment of the device 100) can thus identify the priority level of the ongoing data transmission 306 and decide whether or not to issue an NTS message 524.

FIGS. 10A and 10B illustrate non-limiting examples of controlling the transmission interval 510 for priority management in the LAT procedure. FIG. 10B shows that having a shorter transmission interval 510 set for the embodiments AN1 and UE1 of the first radio link 512 and/or for the corresponding data transmission 306 allows the embodiment AN2 of the device 100 to transmit higher priority data 502 to the embodiment UE2 of the device 200 earlier compared to the counterpart LAT parameter configuration illustrated in FIG. 10A.

In any embodiment, any of the LAT parameters (e.g., the transmission intervals 510) may be preconfigured based on a type of traffic (e.g., the QoS requirements or a priority level). The pre-configuration may be performed according to the first instance 302.1 and/or 304.1 in the step 302 or 304. Alternatively or in combination, in any embodiment, any of the LAT parameters (e.g., the transmission intervals 510) may be reconfigured at runtime based on the state of the shared radio spectrum.

The reconfiguration may be performed according to the second instance 302.2 and/or 304.2 in the step 302 or 304. The state may depend on the contention levels, the number of nodes or density, the transmission beamwidths, the encountered interference levels, etc.

Figure 11:
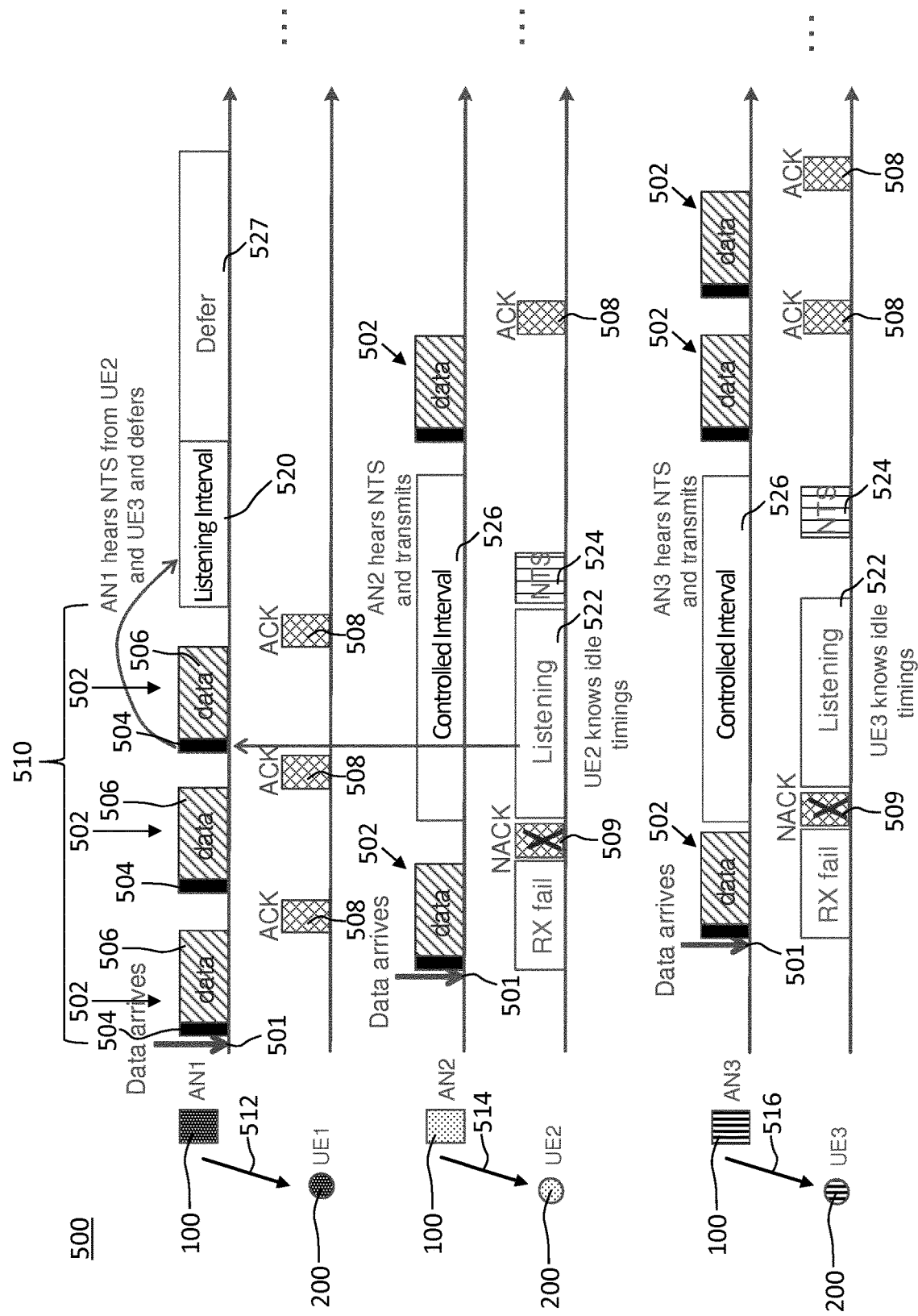
FIG. 11 shows a signaling diagram resulting from sixth embodiments of the devices of FIGS. 1 and 2 for controlling a listening interval.

FIG. 11 shows a signaling diagram 500 resulting from sixth embodiments of the devices 100 and 200 for controlling the listening interval 520 as a non-limiting example of the at least one LAT parameter. The listening interval 520 is also referred to as idle listen interval or idle period. Features and steps that correspond to those of any one of the first to fifth embodiments are indicated by like reference signs.

The transmissions 306 by the embodiment AN1 of the device 100 to the embodiment UE1 of the device 200, i.e., on a first radio link 512, interfere with the transmissions by the embodiments AN2 to UE2 and AN3 to UE3, i.e., on second and third radio links 514 and 516, respectively. By having a prolonged idle listen interval 520, the embodiment AN1 of the device 100 is able to listen to the NTS message 524 transmitted from each of the embodiments UE2 and UE3 of the device 200, and defer in a step 527 accordingly. This allows higher priority traffic, e.g., by AN2 and AN3, to be transmitted.

The technique may be implemented as traffic QoS management based on the LAT procedure by controlling the idle listening interval 520 after the data transmission phase 510. A longer listening interval 520 allows a node (e.g., an embodiment of the device 100) to listen to multiple of NTS messages 524 and/or NNTS messages 528, and defer accordingly. The transmission instants for the NTS messages (e.g., the corresponding frames or transmission time intervals) may be arbitrated in time or selected randomly in time, resulting in different transmission instants used by different embodiments of the device 200, as is schematically indicated in FIG. 11. The transmission instants may be determined, e.g., based on addressing information (e.g., an identifier of the embodiment of the device 200, the associated radio link, traffic QoS requirements, etc.) to avoid potential collisions.

In the non-limiting example in FIG. 11, AN1 as an embodiment of the device 100 is able to listen to the NTS messages 524 transmitted from UE2 and UE3 as embodiments of the device 200 that are not radio-linked to AN1, and defer accordingly. This allows AN2 and AN3 to issue higher priority data traffic to UE2 and UE3, respectively. In the example illustrated in FIG. 11, the directional transmissions 306 from each of the embodiment AN2 and AN3 to the respectively radio-linked embodiments UE2 and UE3 do not interfere with each other. In other words, the radio links 514 and 516 do not interfere with each other, e.g., at least not at the respective receiver embodiments UE2 and UE3 of the device 200.

In any embodiment, multiple LAT parameters may be set (e.g., selected) in the step 304 and/or the step 404 based on a traffic class. Each value for the traffic class may be associated with a value for each of the multiple LAT parameters. Hence, by determining in the step 302 and/or 402 the traffic class (e.g., as an example of the QoS requirement), the multiple LAT parameters are set in the step 304 and/or 404 in accordance with the traffic class association. The traffic class association may be referred to as a mapping relation. The traffic class association may be represented by a table or a corresponding structure in computer-readable memory.

For example, at least two of the initial waiting interval 530, the transmission interval 510 and listening interval 520 are set in the step 304 and/or 404. Each radio link determines in the step 302 and/or 402 the value of each of the initial waiting interval 530, the transmission interval 510 and the listening interval 520 according to the traffic class the radio link belongs to.

The mapping relation between traffic class and LAT parameters may be reflected in a table. The table may be hardcoded (e.g., according a technical specification that applies to both the transmitter embodiment of the device 100 and the receiver embodiment of the device 200). Alternatively or in addition, the table may be used as an efficient LAT parameter determination (e.g., selection) in the step 302 and/or 402 (e.g., including exchanging the traffic class value rather than exchanging multiple LAT parameter values) and/or for setting the LAT parameters in the step 304 and/or 404 of the implementation.

Below table represents a non-limiting example for the traffic class association.

| Traffic class | Initial waiting interval | Transmission interval | Listening interval |
|---|---|---|---|
| 1 | 0 | 6 ms | 100 μs |
| 2 | 100 μs | 4 ms | 200 μs |
| 3 | 200 μs | 2 ms | 300 μs |
| 4 | 300 μs | 1 ms | 400 μs |

The value of the traffic class is indicated in the first column, and the associated LAT parameter values are indicated in the corresponding row. A numerically smaller value for the traffic class corresponds to a higher priority level.

In any embodiment, the traffic class association may be used for an initial setting of the one or more LAT parameters in the step 302 and/or 404, e.g., according to the first instance 302.1.

Alternatively or in addition, the LAT parameter may be determined based on the state of the shared radio spectrum. For example, at least one LAT parameter may be initially set according to the first instance of the step 304 and changed responsive to (i.e., adapted to) a surrounding environment according to the second instance of the step 304. For example, the initial waiting interval 530, the transmission interval 510 and/or the listening interval 520 may be changed responsive to the state of the shared radio spectrum.

The traffic QoS requirements of different links (each of which may correspond to a value of the traffic class) may be managed by setting in the step 304 and/or 404 any one of the LAT parameters mentioned herein. Particularly, the LAT parameters may be set and applied (in the step 306 and/or 406) in combination. Furthermore, the LAT parameters, such as the initial waiting interval 530, the transmission interval 510 and the listening interval 520 of the LAT procedure may be adapted at runtime based on the state of the shared radio spectrum, e.g., based on contention levels, number of nodes and/or node density, transmission beamwidths, encountered interference levels, etc.

In the following, a utility function, U, is defined as a decision criterion whether or not to change and/or a selection criterion for changing (i.e. adapting) the at least one LAT parameter.

$$U = w_1 \cdot P_1 + w_2 \cdot P_2 + w_3 \cdot P_3 + w_4 \cdot P_4 + \ldots + w_i \cdot P_i \quad \text{(Eq. 1)}$$

Herein, the components $P_1, P_2, \ldots, P_i$ of the state are the influencing factors of the at least one LAT parameter, and $w_1, w_2 \ldots w_i$ are their associated weights indicating the importance of the respective components. The weights may be preselected based on a network scenario itself and/or may be adapted at or after deployment of a network (e.g., a radio access network, particularly a cellular network), e.g., according to a varying network (e.g., depending on topology of the network and/or a density of the base stations of the network), channel conditions and the contention level. The values for the weights are in the range [0, 1] and are normalized, i.e., their sum is equal to 1: $\Sigma_i w_i = 1$.

The value U of utility function may represent the state of the shared radio spectrum. Alternatively or in addition, the traffic class or priority level may be determined based on the value U of utility function. For example, each of mutually disjoint ranges of the utility function may be associated with a traffic class (as an example of the priority level).

As a non-limiting example, the components $P_i$ may include one or more of the following examples: $P_1$ is a component of the state indicating the spectral interference in the shared radio spectrum. $P_2$ is a component of the state indicating the contention level in the shared radio spectrum. $P_3$ is a component indicating the transmission beamwidth for directional transmissions in the shared radio spectrum. P4 is a component indicating the node density of nodes (e.g., base stations and/or radio devices) using the shared radio spectrum. P5 is a component indicating the past behavior or a past value of the utility function U. The component P5 allows changing the at least one LAT parameter depending on the past behavior and capturing the historic behavior of the utility function, e.g., for a certain degree of continuity in the LAT parameters.

A higher value, U, of the utility function indicates that a longer initial waiting interval 530, shorter transmission interval 510 and a longer listening interval 520 is to be set in the step 304 and/or 404, and vice-versa for lower values of U. An implementation this dependency in step 304 and/or 404 (e.g., according to the second instance 304.2, either in combination with the first instance 304.1 of the step 304 or implemented independently) is described. A default value A for the initial waiting interval 530, a default value B for the transmission interval 510 and/or a default value C for the listening interval 520 is defined (e.g., initially set). For each radio link, the current values A', B' and/or C' are set (e.g., changed) to A'=A/U, B'=B·U and/or C'=C/U. Herein, the value U of the utility function is in the range (0, 1).

The utility function in Eq. 1 is a non-limiting example. Other utility functions can be defined depending upon the implementation specifics at the radio device (e.g., a terminal) and/or the base station or any other network equipment.

Figure 12:
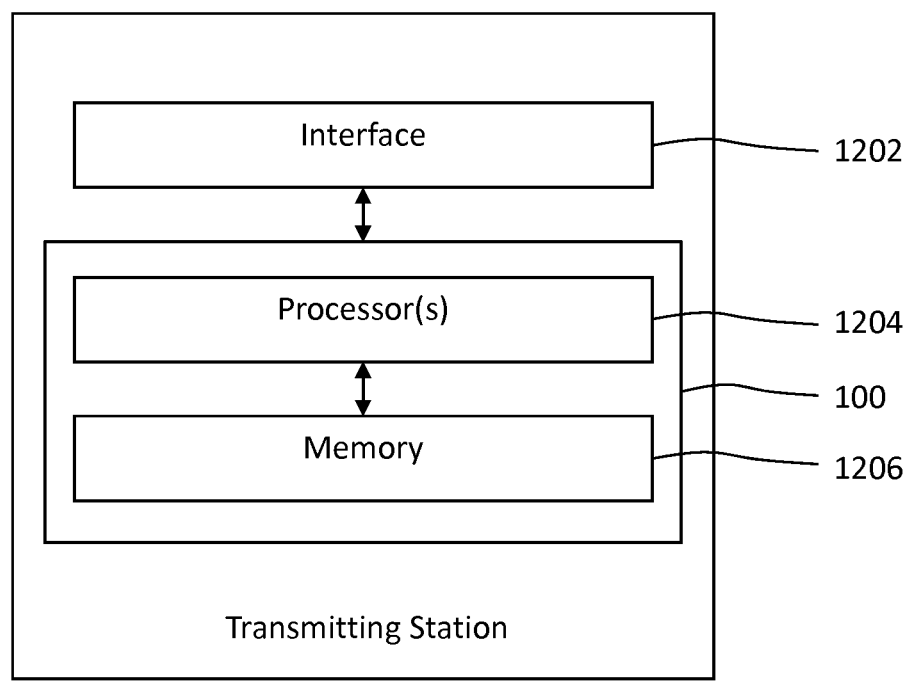
FIG. 12 shows a schematic block diagram of a seventh embodiment of the device of FIG. 1.

FIG. 12 shows a schematic block diagram for an embodiment of the device 100. The device 100 comprises one or more processors 1204 for performing the method 300 and memory 1206 coupled to the processors 1204. For example, the memory 1206 may be encoded with instructions that implement at least one of the modules 102, 104 and 106.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1206, data transmitter functionality. For example, the one or more processors 1204 may execute instructions stored in the memory 1206. Such functionality may include providing various features and steps discussed herein, including any of the benefits disclosed herein. The expression "the device being operative to perform an action" may denote the device 100 being configured to perform the action.

As schematically illustrated in FIG. 12, the device 100 may be embodied by a transmitting station 1200 (e.g., a base station of a radio access network, RAN), which may also be referred to as a source node (e.g., an eNB or gNB). The transmitting station 1200 comprises a radio interface 1202 coupled to the device 100 for radio communication with one or more receiving stations.

Figure 13:
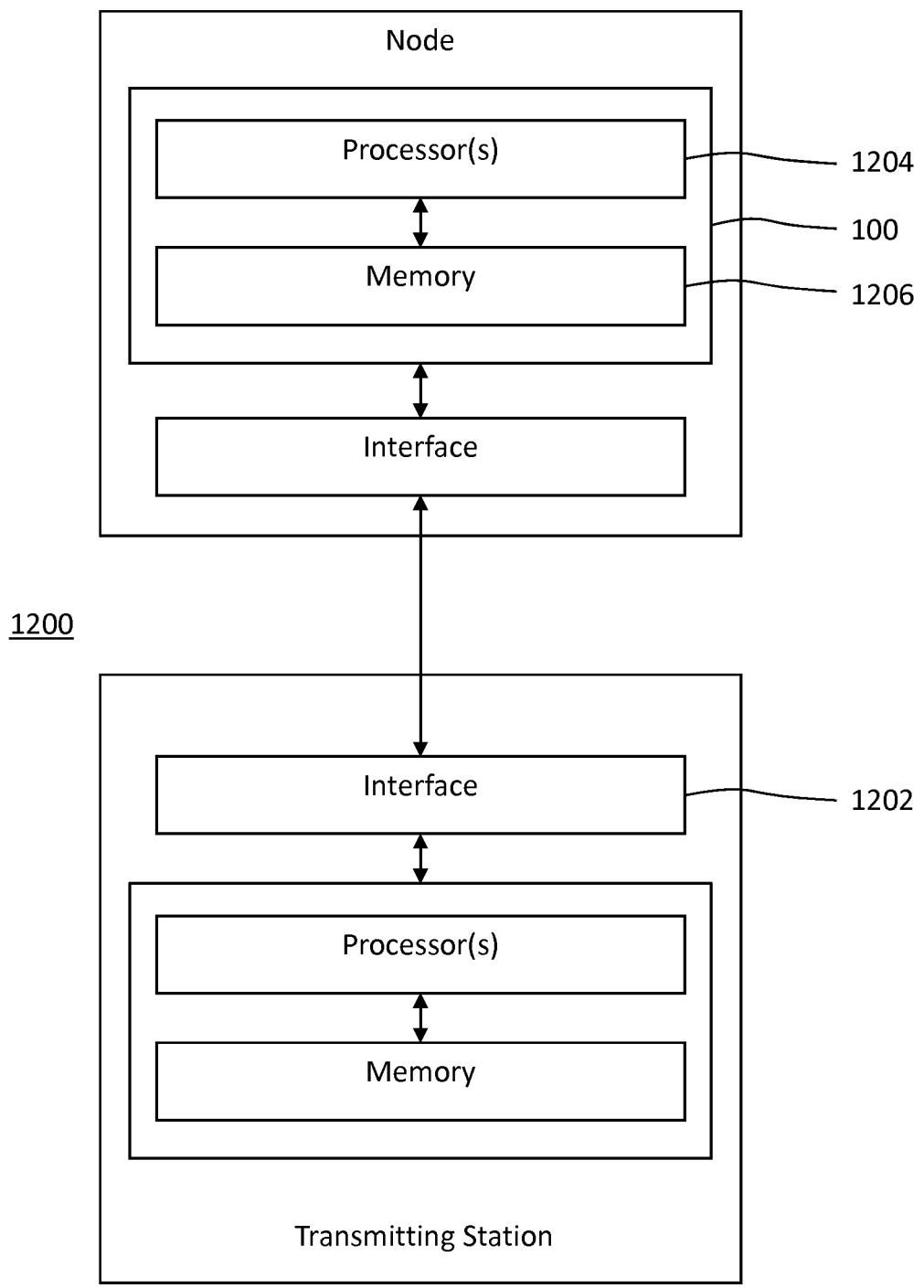
FIG. 13 shows a schematic block diagram of an eighth embodiment of the device of FIG. 1.

In a variant, e.g., as schematically illustrated in FIG. 13, the functionality of the device 100 is provided by a node of a network (e.g., the RAN or a core network, CN, wired or radio-linked to the RAN). That is, the node performs the method 300. The functionality of the device 100 is provided by the node to the transmitting station 1200, e.g., via the interface 1202 or a dedicated wired or wireless interface.

Figure 14:
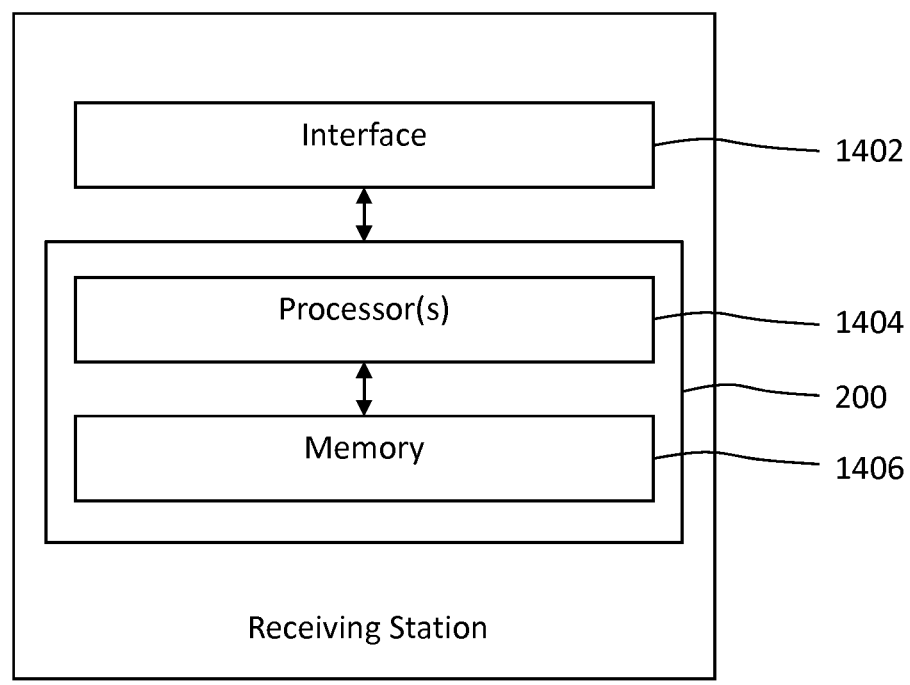
FIG. 14 shows a schematic block diagram of a seventh embodiment of the device of FIG. 2.

FIG. 14 shows a schematic block diagram for an embodiment of the device 200. The device 200 comprises one or more processors 1404 for performing the method 400 and memory 1406 coupled to the processors 1404. For example, the memory 1406 may be encoded with instructions that implement at least one of the modules 202, 204 and 206.

The one or more processors 1404 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1406, data receiver functionality. For example, the one or more processors 1404 may execute instructions stored in the memory 1406. Such functionality may include providing various features and steps discussed herein, including any of the benefits disclosed herein. The expression "the device being operative to perform an action" may denote the device 200 being configured to perform the action.

As schematically illustrated in FIG. 14, the device 200 may be embodied by a receiving station 1400 (e.g., a radio device configured to access a RAN), which may also be referred to as a destination node (e.g., a UE). The receiving station 1400 comprises a radio interface 1402 coupled to the device 200 for radio communication with one or more transmitting stations.

Figure 15:
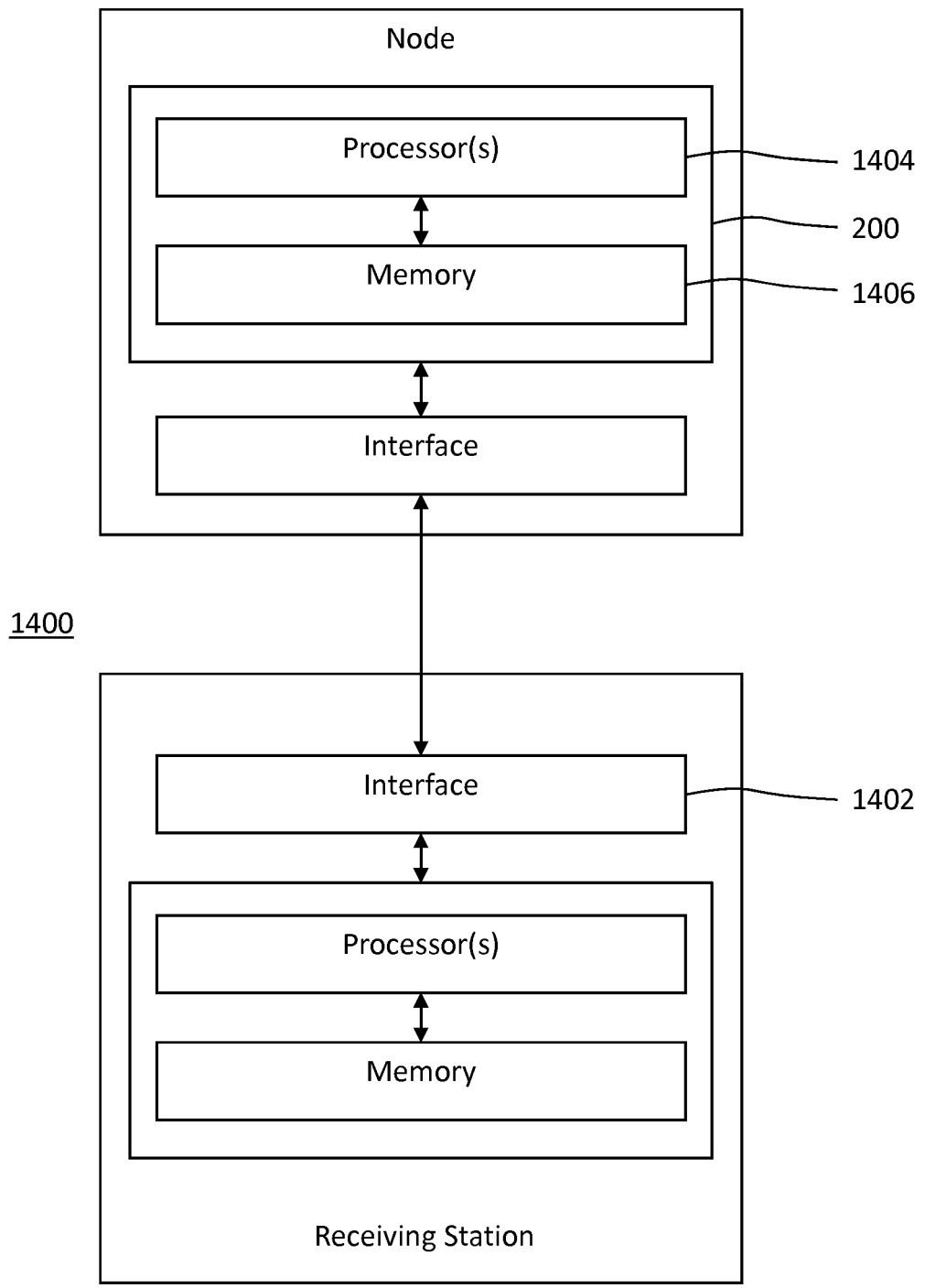
FIG. 15 shows a schematic block diagram of an eighth embodiment of the device of FIG. 2.

In a variant, e.g., as schematically illustrated in FIG. 15, the functionality of the device 200 is provided by a node of a local or ad hoc network (e.g., via Bluetooth).

That is, the node performs the method 400. The functionality of the device 200 is provided by the node to the receiving station 1400, e.g., via the interface 1402 or a dedicated wired or wireless interface.

Figure 16:
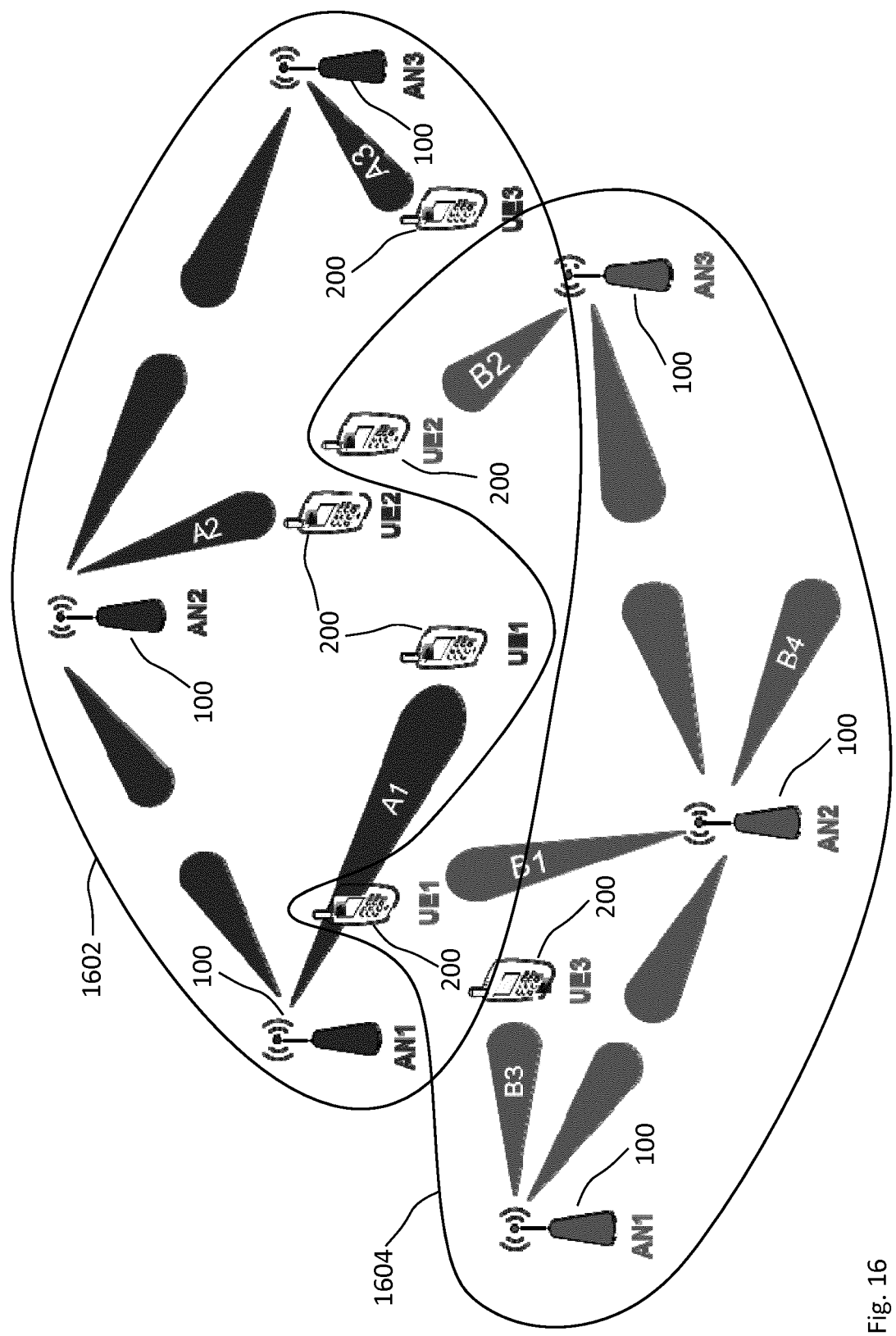
FIG. 16 schematically illustrates coexisting radio links between embodiments of the devices of FIGS. 1 and 2.

FIG. 16 schematically illustrates coexisting radio links between embodiments of the devices 100 and 200. Each of the devices 100 and 200 may be implemented according to any of the embodiments disclosed herein. Base stations implementing the device 100 transmit on beams labeled by "Ax" with x being 1, 2 or 3 and belong to a first RAN 1602. Base stations implementing the device 100 transmit on beams labeled by "Bx" with x being 1, 2, 3 and 4 and belong to a second RAN 1604. The first and second RANs 1602 and 1604 coexist on the shared radio spectrum by applying the technique.

As has become apparent from above description, embodiments of the technique enable a LAT mechanism in combination with directional transmissions to circumvent beamforming problems caused by an LBT-based medium access, e.g., as evident from above presented simulation results in FIGS. 7A and 7B.

Optionally, the technique may be implemented to manage medium access priorities of different nodes (e.g., pairwisely radio-linked transmitters and receivers) with different traffic QoS demands in the LAT scheme. The nodes with high priority traffic are prioritized for the LAT-based medium access as compared to the nodes with low priority traffic QoS demands, e.g., by controlling the initial waiting interval and/or the listening interval. Moreover, the medium occupancy in the LAT scheme by nodes with low priority traffic is traded off to favor nodes with potentially high priority traffic, e.g., by controlling the transmission interval.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data on shared radio spectrum according to a listen after talk (LAT) procedure for sharing the shared radio spectrum among at least two systems, the method comprising or triggering the steps of:

setting one or more parameters of the LAT procedure, at least one of the one or more parameters being set depending on a Quality of Service (QoS) requirement of the data and a state of the shared radio spectrum, the state of the shared radio spectrum relating to at least one of a contention level in the shared radio spectrum, spectral interference in the shared radio spectrum, and a beamwidth of directional transmissions of the data; and transmitting the data on the shared radio spectrum according to the LAT procedure using the one or more parameters;

the one or more parameters of the LAT procedure including an initial waiting interval, the waiting interval being a time starting from an availability of the data for transmission to a start of the transmission; and the waiting interval being set depending on the QoS requirement of the data and the state of the shared radio spectrum.

2. The method of claim 1, wherein the LAT procedure includes one or more intervals, and the one or more parameters of the LAT procedure include a duration of at least one of the one or more intervals.

3. The method of claim 1, wherein the LAT procedure includes an initial waiting interval, and the one or more parameters of the LAT procedure include a duration of the initial waiting interval, wherein the initial waiting interval is triggered by the availability of the data to be transmitted.

4. The method of claim 3, wherein the duration of the initial waiting interval depends on the QoS requirement and a decreasing function for the duration of the initial waiting interval, the decreasing function for the duration of the initial waiting interval depending on the QoS requirement.

5. The method of claim 1, wherein the LAT procedure includes a transmission interval for the transmission of the data, and the one or more parameters of the LAT procedure include a duration of the transmission interval, wherein the transmission interval starts by the transmission of the data.

6. The method of claim 5, wherein the dependency of the duration of the transmission interval on the QoS requirement includes an increasing function for the duration of the transmission interval depending on the QoS requirement.

7. The method of claim 1, wherein the LAT procedure includes receiving one or more control signals from at least one of a receiver of the data, a transmitter interfering the data transmission, a receiver being interfered by the data transmission and a transmitter being interfered by the data transmission.

8. The method of claim 7, wherein the LAT procedure includes a listening interval for receiving at least one of the control signals, and the one or more parameters of the LAT procedure include a duration of the listening interval, wherein the listening interval is subsequent to the transmission of the data.

9. The method of claim 8, wherein the dependency of the duration of the listening interval on the QoS requirement includes a decreasing function for the duration of the transmission interval depending on the QoS requirement.

10. The method of claim 1, wherein setting the one or more parameters of the LAT procedure includes setting the one or more parameters to one or more predefined initial values based on the QoS requirement.

11. The method of claim 1, wherein setting the one or more parameters of the LAT procedure includes updating the one or more parameters responsive to a change of the state of the shared radio spectrum.

12. The method of claim 1, further comprising or triggering:

computing a utility function representing the state of the shared radio spectrum, the utility function depending on at least one of a spectral interference on the shared radio spectrum, a contention level on the shared radio spectrum, a beamwidth used for the transmission on the shared spectrum and a density of stations using the shared spectrum according to the LAT procedure.

13. The method of claim 1, wherein the data is transmitted on a radio link between a transmitter and a receiver, and wherein the QoS requirement of the data is specific for at least one of the transmitter, the receiver and the radio link.

14. The method of claim 1, wherein multiple radio links coexist using the shared radio spectrum according to the LAT procedure.

15. The method of claim 1, wherein the transmission of the data uses beamforming.

16. The method of claim 1, further comprising or triggering the step of:

determining at least one of the QoS requirement of the data and the state of the shared radio spectrum.

17. The method of claim 1, wherein setting the one or more parameters of the LAT procedure includes transmitting or receiving at least one configuration message that is indicative of at least one of the one or more parameters of the LAT procedure.

18. A method of receiving data on shared radio spectrum according to a listen after talk (LAT) procedure for sharing the shared radio spectrum among at least two systems, the method comprising or triggering the steps of:

setting one or more parameters of the LAT procedure, at least one of the one or more parameters being set depending on a Quality of Service (QoS) requirement of the data and a state of the shared radio spectrum, the state of the shared radio spectrum relating to at least one of a contention level in the shared radio spectrum, spectral interference in the shared radio spectrum, and a beamwidth of directional transmissions of the data; and receiving the data on the shared radio spectrum according to the LAT procedure using the one or more parameters;

the one or more parameters of the LAT procedure including an initial waiting interval, the waiting interval being a time starting from an availability of the data for transmission to a start of the transmission; and the waiting interval being set depending on the QoS requirement of the data and the state of the shared radio spectrum.

19. The method of claim 18, wherein the LAT procedure includes one or more intervals, and the one or more parameters of the LAT procedure include a duration of at least one of the one or more intervals.

20. The method of claim 18, wherein the LAT procedure includes a transmission interval for the transmission of the data, and the one or more parameters of the LAT procedure include a duration of the transmission interval.

21. The method of claim 18, wherein the LAT procedure includes a listening interval for at least one of transmitting and receiving one or more control signals, and the one or more parameters of the LAT procedure include a duration of the listening interval.

22. The method of claim 18, wherein the LAT procedure includes transmitting one or more control signals to at least one of a transmitter of the data and an interfering transmitter.

23. The method of claim 18, wherein setting the one or more parameters of the LAT procedure includes updating the one or more parameters responsive to a change of the state of the shared radio spectrum.

24. The method of claim 18, further comprising or triggering:
computing a utility function representing the state of the shared radio spectrum, the utility function depending on at least one of a spectral interference on the shared radio spectrum, a contention level on the shared radio spectrum, a beamwidth used for the transmission on the shared spectrum and a density of stations using the shared spectrum according to the LAT procedure.

25. The method of claim 18, wherein the reception of the data uses beamforming.

26. A device for transmitting data on shared radio spectrum according to a listen after talk (LAT) procedure for sharing the shared radio spectrum among at least two systems, the device comprising at least one processor and a memory, the memory comprising instructions executable by the at least one processor, whereby the device is configured to:
set one or more parameters of the LAT procedure, at least one of the one or more parameters being set depending on a Quality of Service (QoS) requirement of the data and a state of the shared radio spectrum, the state of the shared radio spectrum relating to at least one of a contention level in the shared radio spectrum, spectral interference in the shared radio spectrum, and a beamwidth of directional transmissions of the data; and transmit the data on the shared radio spectrum according to the LAT procedure using the one or more parameters;

the one or more parameters of the LAT procedure including an initial waiting interval, the waiting interval being a time starting from an availability of the data for transmission to a start of the transmission; and the waiting interval being set depending on the QoS requirement of the data and the state of the shared radio spectrum.

27. A device for receiving data on shared radio spectrum according to a listen after talk (LAT) procedure for sharing the shared radio spectrum among at least two systems, the device comprising at least one processor and a memory, the memory comprising instructions executable by the at least one processor, whereby the device is configured to:
set one or more parameters of the LAT procedure, at least one of the one or more parameters is being set depending on a Quality of Service (QoS) requirement of the data and a state of the shared radio spectrum, the state of the shared radio spectrum relating to at least one of a contention level in the shared radio spectrum, spectral interference in the shared radio spectrum, and a beamwidth of directional transmissions of the data; and receive the data on the shared radio spectrum according to the LAT procedure using the one or more parameters;

the one or more parameters of the LAT procedure including an initial waiting interval, the waiting interval being a time elapsed starting from an availability of the data for transmission to a start of the transmission; and the waiting interval being set depending on the QoS requirement of the data and the state of the shared radio spectrum.

* * * * *